United States Patent
Cameron et al.

(10) Patent No.: US 12,314,406 B1
(45) Date of Patent: May 27, 2025

(54) GENERATIVE CYBERSECURITY EXPLOIT DISCOVERY AND EVALUATION

(71) Applicant: Citibank, N.A., New York, NY (US)

(72) Inventors: William Franklin Cameron, Jacksonville, FL (US); Pramod Goyal, Ahmedabad (IN); Prithvi Narayana Rao, Allen, TX (US); Manjit Rajaretnam, Irving, TX (US); Miriam Silver, Tel Aviv (IL); James Myers, New York, NY (US)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 18/900,430

(22) Filed: Sep. 27, 2024

Related U.S. Application Data

(63) Continuation-in-part of application No. 18/792,523, filed on Aug. 1, 2024, which is a continuation-in-part of application No. 18/607,141, filed on Mar. 15, 2024, which is a continuation-in-part of application No. 18/399,422, filed on Dec. 28, 2023, which is a continuation of application No. 18/327,040, filed on May 31, 2023, now Pat. No. 11,874,934, which is a continuation-in-part of application No. 18/114,194, filed on Feb. 24, 2023, now Pat. No. 11,763,006, which is a continuation-in-part of application No. 18/098,895, filed on Jan. 19, 2023, now Pat. No. 11,748,491.

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01)

(58) Field of Classification Search
CPC ............................ G06F 21/577; G06F 21/552
See application file for complete search history.

(56) References Cited

U.S. PATENT DOCUMENTS

| | | |
|---|---|---|
| 8,380,817 B2 | 2/2013 | Okada |
| 8,387,020 B1 | 2/2013 | Maclachlan et al. |
| | (Continued) | |

FOREIGN PATENT DOCUMENTS

WO   2021160499 A1   8/2021

OTHER PUBLICATIONS

Coalition for Content Provenance and Authenticity, Contents Credentials C2PA Technological Specification, v2.1,Sep. 20, 2024. (Year: 2024).

(Continued)

*Primary Examiner* — Stephen T Gundry
(74) *Attorney, Agent, or Firm* — Perkins Coie LLP

(57) ABSTRACT

Described herein are systems and methods for discovering and proactively mitigating previously unknown security vulnerabilities. The systems and methods herein can utilize security vulnerability information to discover potential security threats and can utilize this information to generate an attack using a machine learning model, such as a large language model. Generated attacks can be carried out to assess impact of a security vulnerability. An output can be provided that represents the assessed impact. In some implementations, the systems and methods herein generate patches or other mitigations for security vulnerabilities, which can be tested and deployed to address security vulnerabilities.

20 Claims, 16 Drawing Sheets

(56) References Cited

U.S. PATENT DOCUMENTS

| | | |
|---|---|---|
| 10,620,988 B2 | 4/2020 | Lauderdale et al. |
| 10,943,067 B1 | 3/2021 | Brown et al. |
| 11,042,647 B1 | 6/2021 | Joyce et al. |
| 11,133,942 B1 | 9/2021 | Griffin |
| 11,227,187 B1 | 1/2022 | Weinberger |
| 11,328,068 B1 | 5/2022 | Niedzwiedz et al. |
| 11,410,136 B2 | 8/2022 | Cook et al. |
| 11,516,222 B1 | 11/2022 | Srinivasan et al. |
| 11,706,241 B1 | 7/2023 | Cross et al. |
| 11,720,686 B1 | 8/2023 | Cross et al. |
| 11,734,418 B1 | 8/2023 | Epstein |
| 11,741,226 B2 | 8/2023 | Dixit |
| 12,028,368 B1 | 7/2024 | Cohen et al. |
| 12,107,869 B1* | 10/2024 | Kannan ................. H04L 63/20 |
| 12,135,949 B1 | 11/2024 | Cameron et al. |
| 12,149,553 B1 | 11/2024 | Fly et al. |
| 12,149,558 B1 | 11/2024 | Brown et al. |
| 12,155,781 B1 | 11/2024 | Helfgott et al. |
| 12,182,258 B2 | 12/2024 | Stokes et al. |
| 2003/0007178 A1 | 1/2003 | Jeyachandran et al. |
| 2004/0098454 A1 | 5/2004 | Trapp et al. |
| 2005/0204348 A1 | 9/2005 | Horning et al. |
| 2006/0095918 A1 | 5/2006 | Hirose |
| 2007/0067848 A1 | 3/2007 | Gustave et al. |
| 2010/0275263 A1 | 10/2010 | Bennett et al. |
| 2010/0313189 A1 | 12/2010 | Beretta et al. |
| 2014/0137257 A1 | 5/2014 | Martinez et al. |
| 2014/0258998 A1 | 9/2014 | Adl-Tabatabai et al. |
| 2017/0061132 A1 | 3/2017 | Hovor et al. |
| 2017/0279826 A1 | 9/2017 | Mohanty et al. |
| 2017/0295197 A1 | 10/2017 | Parimi et al. |
| 2018/0020021 A1 | 1/2018 | Gilmore et al. |
| 2018/0239903 A1 | 8/2018 | Bodin et al. |
| 2018/0343114 A1 | 11/2018 | Ben-Ari |
| 2019/0188706 A1 | 6/2019 | Mccurtis |
| 2019/0236661 A1 | 8/2019 | Hogg et al. |
| 2019/0286816 A1 | 9/2019 | Fu |
| 2020/0012493 A1 | 1/2020 | Sagy |
| 2020/0074470 A1 | 3/2020 | Deshpande et al. |
| 2020/0153855 A1 | 5/2020 | Kirti et al. |
| 2020/0219009 A1 | 7/2020 | Dao et al. |
| 2020/0233979 A1 | 7/2020 | Tahmasebi Maraghoosh et al. |
| 2020/0259852 A1 | 8/2020 | Wolff et al. |
| 2020/0309767 A1 | 10/2020 | Loo et al. |
| 2020/0310866 A1 | 10/2020 | Varadaraj et al. |
| 2020/0314191 A1 | 10/2020 | Madhavan et al. |
| 2020/0349054 A1 | 11/2020 | Dai et al. |
| 2020/0380118 A1 | 12/2020 | Miller et al. |
| 2020/0387608 A1 | 12/2020 | Miller et al. |
| 2021/0049288 A1 | 2/2021 | Li |
| 2021/0089941 A1 | 3/2021 | Chen et al. |
| 2021/0133182 A1 | 5/2021 | Anderson et al. |
| 2021/0185094 A1 | 6/2021 | Waplington et al. |
| 2021/0211431 A1 | 7/2021 | Albero et al. |
| 2021/0256125 A1 | 8/2021 | Miller et al. |
| 2021/0264547 A1 | 8/2021 | Li |
| 2021/0273957 A1 | 9/2021 | Boyer et al. |
| 2021/0390465 A1 | 12/2021 | Werder et al. |
| 2022/0050928 A1 | 2/2022 | Shukla et al. |
| 2022/0114251 A1 | 4/2022 | Guim Bernat et al. |
| 2022/0147636 A1 | 5/2022 | Mahuli et al. |
| 2022/0263843 A1 | 8/2022 | Aslam et al. |
| 2022/0263855 A1 | 8/2022 | Engelberg et al. |
| 2022/0263860 A1 | 8/2022 | Crabtree et al. |
| 2022/0278889 A1 | 9/2022 | Malleshaiah et al. |
| 2022/0286438 A1 | 9/2022 | Burke et al. |
| 2022/0286474 A1 | 9/2022 | Kuppa et al. |
| 2022/0294789 A1 | 9/2022 | Tikhomirov et al. |
| 2022/0294810 A1 | 9/2022 | Tyagi et al. |
| 2022/0303295 A1 | 9/2022 | Erlingsson et al. |
| 2022/0303300 A1 | 9/2022 | Egan |
| 2022/0303352 A1 | 9/2022 | Herzog et al. |
| 2022/0334818 A1 | 10/2022 | Mcfarland |
| 2022/0398149 A1 | 12/2022 | Mcfarland et al. |
| 2022/0405397 A1 | 12/2022 | Golan et al. |
| 2022/0417274 A1 | 12/2022 | Madanahalli et al. |
| 2023/0032686 A1 | 2/2023 | Williams et al. |
| 2023/0035321 A1 | 2/2023 | Vijayaraghavan |
| 2023/0052608 A1 | 2/2023 | Wattiau et al. |
| 2023/0067128 A1 | 3/2023 | Engelberg et al. |
| 2023/0071264 A1 | 3/2023 | Hakala et al. |
| 2023/0076372 A1 | 3/2023 | Engelberg et al. |
| 2023/0077527 A1 | 3/2023 | Sarkar |
| 2023/0114719 A1 | 4/2023 | Thomas et al. |
| 2023/0117962 A1 | 4/2023 | Kaimal et al. |
| 2023/0118388 A1 | 4/2023 | Crabtree et al. |
| 2023/0123314 A1 | 4/2023 | Crabtree et al. |
| 2023/0132703 A1 | 5/2023 | Marsenic et al. |
| 2023/0135660 A1 | 5/2023 | Chapman et al. |
| 2023/0148116 A1 | 5/2023 | Stokes et al. |
| 2023/0169397 A1 | 6/2023 | Smith et al. |
| 2023/0205888 A1 | 6/2023 | Tyagi et al. |
| 2023/0205891 A1 | 6/2023 | Yellapragada et al. |
| 2023/0208869 A1 | 6/2023 | Bisht et al. |
| 2023/0208870 A1 | 6/2023 | Yellapragada et al. |
| 2023/0208871 A1 | 6/2023 | Yellapragada et al. |
| 2023/0229542 A1 | 7/2023 | Watkins et al. |
| 2023/0259860 A1 | 8/2023 | Sarkar |
| 2023/0269272 A1 | 8/2023 | Dambrot et al. |
| 2023/0274003 A1 | 8/2023 | Liu et al. |
| 2023/0362200 A1 | 11/2023 | Crabtree et al. |
| 2023/0396641 A1 | 12/2023 | Hebbagodi et al. |
| 2023/0412635 A1 | 12/2023 | Binyamini et al. |
| 2024/0037245 A1 | 2/2024 | Kahan et al. |
| 2024/0054233 A1 | 2/2024 | Ohayon et al. |
| 2024/0054249 A1 | 2/2024 | Loubet Moundi et al. |
| 2024/0256678 A1* | 8/2024 | Thompson ............ G06F 21/577 |
| 2024/0323202 A1* | 9/2024 | Niv ........................ H04L 63/104 |
| 2024/0333743 A1* | 10/2024 | Bazalgette .......... H04L 63/1416 |
| 2024/0333753 A1* | 10/2024 | Cross .................. H04L 63/1433 |
| 2024/0340301 A1* | 10/2024 | Thompson .............. H04L 63/20 |
| 2024/0340302 A1* | 10/2024 | Wang ...................... G06N 20/00 |
| 2024/0346151 A1 | 10/2024 | Goswami et al. |
| 2024/0356984 A1* | 10/2024 | Gamra ............... H04L 63/1425 |
| 2024/0356986 A1* | 10/2024 | Crabtree ............. G06F 16/2477 |
| 2024/0364725 A1* | 10/2024 | Sinha .................. H04L 63/1416 |
| 2024/0364749 A1 | 10/2024 | Crabtree et al. |
| 2024/0403420 A1* | 12/2024 | Lal ........................ G06F 21/566 |
| 2024/0403428 A1 | 12/2024 | Lal et al. |
| 2024/0403437 A1 | 12/2024 | Szigeti et al. |
| 2024/0403445 A1 | 12/2024 | Straub et al. |
| 2024/0406145 A1 | 12/2024 | Crabtree et al. |
| 2024/0411896 A1 | 12/2024 | Myers et al. |
| 2024/0414191 A1* | 12/2024 | Humphrey ............ H04L 63/205 |
| 2024/0414211 A1 | 12/2024 | Boyer et al. |
| 2025/0005167 A1 | 1/2025 | Millar et al. |
| 2025/0013753 A1 | 1/2025 | Conway |
| 2025/0021464 A1 | 1/2025 | Lang et al. |

OTHER PUBLICATIONS

Farris, K., A., et al., "Vulcon: A System for Vulnerability Prioritization, Mitigation, and Management," ACM Transactions on Privacy and Security, vol. 21, No. 4, Article 16. Publication date: Jun. 2018, 28 pages.

Stokes, et al. "Preventing Machine Learning Poisoning Attacks Using Authentication and Provenance", MILCOM 2021—2021 IEEE Military Communications Conference (MILCOM), 2021, pp. 181-188. (Year: 2021).

AI Risk Management Framework Nist, retrieved on Jun. 17, 2024, https://www.nist.gov/itl/ai-risk-management-framework.

Independent analysis of AI language models and API providers. Artificial Analysis, retrieved on Jun. 13, 2024, https://artificialanalysis.ai/, 11 pages.

Brown, D., et al., "The Great AI Challenge: We Test Five Top Bots on Useful, Everyday Skills," The Wall Street Journal, published May 25, 2024.

Dong, Y., et al., "Building Guardrails for Large Language Models," https://ar5iv.labs.arxiv.org/html/2402.01822v1, published May 29, 2024, 20 pages.

International Search Report and Written Opinion Received received in Application No. PCT/US23/85942, dated Feb. 15, 2024, 6 pages.

(56) References Cited

OTHER PUBLICATIONS

Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.

Mavrepis, P., et al., "XAI for All: Can Large Language Models Simplify Explainable AI?," https://arxiv.org/abs/2401.13110, Jan. 23, 2024, 10 pages.

Wei, Jason, et al. "Chain-of-Thought Prompting Elicits Reasoning in Large Language Models," 36th Conference on Neural Information Processing Systems (NeurIPS 2022), arXiv:2201.11903 [cs.CL], Jan. 10, 2023, 43 pages.

Zhao, H., et al., "Explainability for Large Language Models: A Survey," https://arxiv.org/abs/2309.01029, Nov. 28, 2024, 38 pages.

Aggarwal, Nitin, "Why measuring your new AI is essential to its succes", KPIs for gen AI: Why measuring your new AI is essential to its succes, 7 pages.

AI, "What is AI Verify?", What is AI Verify—AI Verify Foundation.

Altman, Sam, "Sam Altman Admits That OpenAI Doesn't Actually Understand How Its AI Works", Sam Altman Admits That OpenAI Doesn't Actually Understand How Its AI Works—"We certainly have not solved interpretability.", 4 pages.

Anthrop/C, "Mapping the Mind of a Large Language Model", Mapping the Mind of a Large Language Model, May 21, 2024.

Claburn, Thomas, "OpenAI's GPT-4 can exploit real vulnerabilities by reading security advisories", OpenAI's GPT-4 can exploit real vulnerabilities by reading security advisories, Apr. 17, 2024, 3 pages.

Marshall, Andrew, "Threat Modeling AI/ML Systems and Dependencies", Threat Modeling AI/ML Systems and Dependencies, Nov. 2, 2022, 27 pages.

Roose, Kevin, "A.I. Has a Measurement Problem", A.I. Has a Measurement Problem, Apr. 15, 2024, 5 pages.

Roose, Kevin, "A.I.'s Black Boxes Just Got a Little Less Mysterious", A.I.'s Black Boxes Just Got a Little Less Mysterious, May 21, 2024, 5 pages.

Shah, Harshay, "Decomposing and Editing Predictions by Modeling Model Computation", Decomposing and Editing Predictions by Modeling Model Computation, 5 pages.

Shankar, Ram, "Failure Modes in Machine Learning", , Nov. 2019, 14 pages.

Teo, Josephine, "Singapore launches Project Moonshot", Singapore launches Project Moonshot—a generative Artificial Intelligence testing toolkit to address LLM safety and security challenges, May 31, 2024, 8 pages.

What is AI Verify?, AI Verify Foundation, Jun. 11, 2024, 3 pages, https://aiverifyfoundation.sg/.

Cranium, Adopt & Accelerate AI Safely, retrieved on Nov. 7, 2024, from https://cranium.ai/.

Futurism, "Sam Altman Admits That OpenAI Doesn't Actually Understand How Its AI Works", Jun. 11, 2024, 4 pages, https://futurism.com/sam-altman-admits-openai-understand-ai.

* cited by examiner

800

| Security Label | Assessed | Mitigated |
|---|---|---|
| Platform Usage | ● | ● |
| Cryptography | ● | ● |
| Data Storage | ● | ● |
| Remote Attestation | ▲ | ☐ |
| Application Stability | ● | ● |
| Data Corruption | ● | ● |

| ● | ☐ | ▲ |
|---|---|---|
| Low | Medium | High |

FIG. 8

| Security Label | Current | Proposed | Combined |
|---|---|---|---|
| Input Validation | | | |
| AR | Low | Low | Low |
| MR | Low | Low | Low |
| Third Party Services | | | |
| AR | Low | High | High |
| MR | Low | Medium | Medium |
| API Access | | | |
| AR | Low | Low | Low |
| MR | Low | Low | Low |
| Cryptography | | | |
| AR | Low | Medium | High |
| MR | Low | Low | Medium |
| Authentication | | | |
| AR | Low | Medium | Medium |
| MR | Low | Low | Low |

Legend: ● Low ▪ Medium ▲ High

FIG. 9

| Patch Nutrition Label | Patch 1 | Patch 2 | Patch 3 |
|---|---|---|---|
| Platform | | | |
| AR | ◯ | ◯ | ◯ |
| MR | ◯ | ◯ | ◯ |
| Data Storage | | | |
| AR | ◯ | ◯ | ◯ |
| MR | ◯ | ◯ | ◯ |
| Network | | | |
| AR | ▲ | ▲ | ▲ |
| MR | ◯ | ◻ | ▲ |
| Cryptography | | | |
| AR | ◯ | ◯ | ◯ |
| MR | ◯ | ◯ | ◯ |
| Performance Impact | ◻ | ◯ | ◯ |
| Monitoring Effectiveness | ◯ | ◻ | ▲ |

| ◯ Low | ◻ Medium | ▲ High |
|---|---|---|

FIG. 15

GENERATIVE CYBERSECURITY EXPLOIT DISCOVERY AND EVALUATION

CROSS-REFERENCE TO RELATED APPLICATIONS

This application is a continuation-in-part of U.S. patent application Ser. No. 18/792,523, entitled "GENERATIVE CYBERSECURITY EXPLOIT SYNTHESIS AND MITIGATION" filed on Aug. 1, 2024, which is a continuation-in-part of U.S. patent application Ser. No. 18/607,141 entitled "GENERATING PREDICTED END-TO-END CYBER-SECURITY ATTACK CHARACTERISTICS VIA BIFURCATED MACHINE LEARNING-BASED PROCESSING OF MULTI-MODAL DATA SYSTEMS AND METHODS" filed on Mar. 15, 2024, which is a continuation-in-part of U.S. patent application Ser. No. 18/399,422 entitled "PROVIDING USER-INDUCED VARIABLE IDENTIFICATION OF END-TO-END COMPUTING SYSTEM SECURITY IMPACT INFORMATION SYSTEMS AND METHODS" filed on Dec. 28, 2023, which is a continuation of U.S. patent application Ser. No. 18/327,040 (now U.S. Pat. No. 11,874,934) entitled "PROVIDING USER-INDUCED VARIABLE IDENTIFICATION OF END-TO-END COMPUTING SYSTEM SECURITY IMPACT INFORMATION SYSTEMS AND METHODS" filed on May 31, 2023, which is a continuation-in-part of U.S. patent application Ser. No. 18/114,194 (now U.S. Pat. No. 11,763,006) entitled "COMPARATIVE REAL-TIME END-TO-END SECURITY VULNERABILITIES DETERMINATION AND VISUALIZATION" filed Feb. 24, 2023, which is a continuation-in-part of U.S. patent application Ser. No. 18/098,895 (now U.S. Pat. No. 11,748,491) entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" filed Jan. 19, 2023. The content of the foregoing applications is incorporated herein by reference in its entirety.

BACKGROUND

When determining whether a computing platform (e.g., a cloud-based computing platform, a mobile computing platform, a remote computing platform) or computing system is secure (e.g., safe to use), information security engineers (e.g., network engineers) often rely on publicly available information regarding the computing platforms and systems. However, this publicly available information can be filled with inaccuracies and may be outdated. For example, network engineers may be responsible for choosing the safest, fastest, and most scalable computing platform to provide services to another system. Of these factors, security of the computing platforms is of upmost importance as user data can be processed on such computing platforms and may be susceptible to a data breach if user data is not handled properly. As new security vulnerabilities are discovered by attackers in real-time, such vulnerabilities may be exploited and network engineers relying on publicly available information regarding the security of a computing platform may be unaware of the newly discovered security vulnerabilities as they are not published in the public domain.

Moreover, network engineers employing manual techniques to determine whether the given computing platform or system is impacted by one or more security vulnerabilities often leads to errors and is based on subjective opinion of the engineer. As data relied upon for making such determinations takes time to publish, attackers may exploit user and system data in real-time. Additionally, although such engineers may subjectively determine security vulnerabilities of a given system, determining which vulnerabilities are most threatening is further complicated by differing opinions of network engineers. As a large amount of time and other resources devoted to correcting security vulnerabilities, where network engineers disagree on which vulnerabilities should be corrected first, the computing platform and/or system may continue to be exploited. Moreover, the advent of artificial intelligence can be used maliciously, which attackers leverage to prevent detections of new threats (e.g., via masking computing platform/system updates) that cause advanced techniques to detect advanced threats. Without a way to determine whether a given computing platform is secure at a given moment in time and which vulnerabilities are to be corrected over others, user data may be stolen, system data may be held for ransom, and computing networks may be injected with malicious software unbeknownst to the network engineers until it is too late. These and other drawbacks exist.

BRIEF DESCRIPTION OF THE DRAWINGS

FIG. 8 shows an example zero day security label according to some implementations.

FIG. 9 is a drawing that illustrates an example security label for existing and proposed platforms according to some implementations.

FIG. 15 is a drawing that illustrates an example security label for patches according to some implementations.

Figure 1:
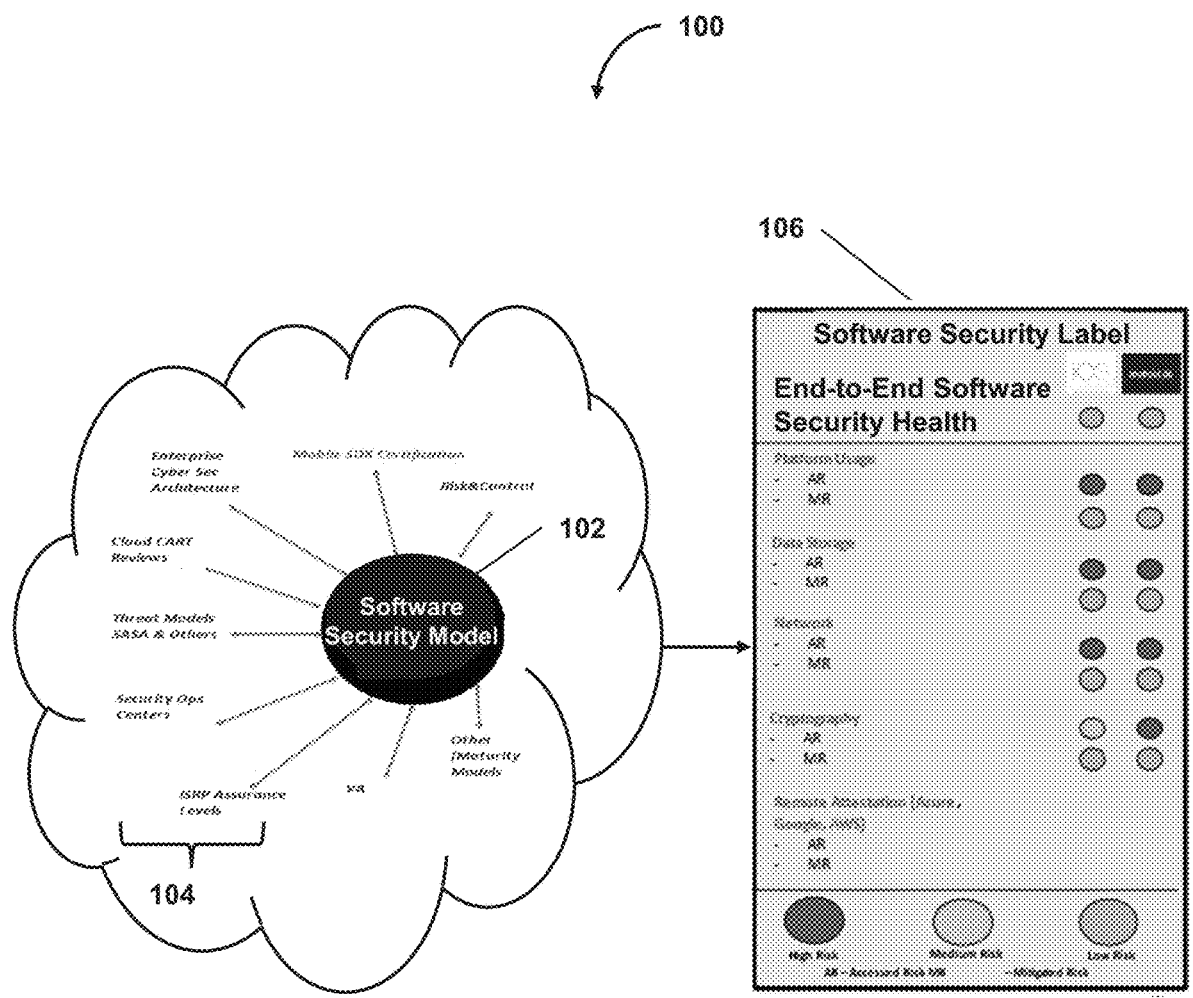
FIG. 1 is a block diagram showing an illustration of components used to determine platform-specific end-to-end security vulnerabilities and a graphical layout for displaying the platform-specific end-to-end security vulnerabilities via a Graphical User Interface (GUI).

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Computer systems are of critical importance to many aspects of life, facilitating commerce, healthcare, transportation, communication, and so forth. Often, computer systems contain sensitive information such as financial records, health records, trade secrets, and so forth. Computer systems thus are attractive targets to threat actors who seek to engage in a wide range of disruptive activities, such as disrupting commerce, stealing information, extorting money (e.g., using ransomware), or engaging in fraudulent activity. Thus, there is a need to protect computer systems against threat actors in order to protect data and help ensure that systems are not compromised or rendered unavailable.

Computer systems can be vulnerable to a wide range of attacks, such as malware (e.g., viruses, worms, spyware, and ransomware), denial of service attacks, man-in-the-middle attacks, SQL injection attacks, credential stuffing attacks, and so forth. In many cases, vulnerabilities are discovered and addressed before they can be exploited by threat actors. However, this is not always the case, and even if patches or other mitigations are available, systems may still be vulnerable. Zero-day vulnerabilities,—vulnerabilities in software or hardware that are typically unknown to a company—can be especially concerning, as these vulnerabilities are not addressed and there may not be a patch or update available. Lack of knowledge of the existence of zero-day vulnerabilities and a lack of mitigation actions can make it difficult to prevent attacks.

Given the potential impacts of systems being exploited, there is a need to discover and address vulnerabilities before they can be used by threat actors. However, discovering vulnerabilities can be a laborious and time-consuming process, and often efforts to uncover zero days are fruitless. Threat actors who uncover a zero day vulnerability can exploit it until developers, system administrators, and so forth are able to learn about and mitigate the zero day vulnerability. Described herein are approaches that can utilize machine learning models to discover vulnerabilities. By discovering vulnerabilities, rather than waiting for threat actors to uncover them, organizations, consumers, and so forth can better protect their systems.

While unknown vulnerabilities represent one significant area of risk for computer systems, another risk is that the attack surface of a computer system or platform (e.g., made up of potentially many different computer systems, services, network connections, etc.) can change over time, such as when changes to a platform architecture are made, vendor systems are added or removed, software is added or removed, account access levels change, software patches are installed, and so forth. As an example, a software application update can introduce a new vulnerability in the overall end-to-end software plus hardware pipeline. Switching from one software application to another (e.g., from one video conferencing application to another) can introduce different vulnerabilities and security considerations. Migrating services from one platform to another (e.g., from a private cloud to a public cloud) can have significant impacts on the attack surface.

Adequately testing for and mitigating against vulnerabilities associated with changes in the attack service is a daunting task, as current approaches typically involve a large amount of manual work, which can be error prone and have poor success rates. Moreover, significant expertise can be needed to effectively evaluate information typically used for discovering vulnerabilities or evaluating attack surface changes.

Attempting to create a system/process to discover zero day vulnerabilities or identify security issues arising from attack surface changes in view of the available conventional approaches create significant technological uncertainty. Creating such platform/system/process require addressing several unknowns in conventional approaches, such as how to automate processes that conventionally involve a great deal of manual effort and rely on human expertise and judgment, as well as how to automatically determine changes to platforms, systems, or applications that impact security, stability, or performance.

Conventional approaches rely on manual analysis of application monitoring data, static analysis data, code analysis data, and so forth, which often fail to uncover vulnerabilities. Conventional approaches for evaluating changes to an attack surface similarly rely on individuals having precise knowledge of changes being made and the potential changes to the attack surface resulting from these changes. For example, conventional approaches that rely on human evaluation often produce inaccurate and/or incomplete analysis, leaving security issues undetected and unresolved. Moreover, conventional approaches are especially unlikely to uncover novel approaches to attacking systems, again leaving systems vulnerable to attack by threat actors.

The use of conventional manual vulnerability identification approaches proved to be prone to errors, oversights, and, in many cases, resulted in applications, systems, or platforms not being tested, tested being incomplete or problematic, or changes to applications, systems, or platforms being delayed due to the long time and large investment of resources used in evaluating change. Even automated tools did not rectify these problems, as analyzing the outputs of such tools still required extensive manual work, which was often incomplete or erroneous. Further, even automated vulnerability identification and analysis tools were limited in their utility as they lack the flexibility of the approaches described herein, again resulting in incomplete or erroneous analysis and leaving systems, including critical infrastructure, compromised and vulnerable to attack.

Thus, the inventors experimented with different methods for discovering vulnerabilities and potential security concerns arising from changes to applications, systems, and platforms in order to identify the best approaches.

Accordingly, there is a growing need for approaches that can evaluate actual or planned changes to determine the potential security impacts of such changes. The approaches described herein can be used to determine and/or evaluate changes in the attack surface, identify known and/or unknown vulnerabilities, mitigate against vulnerabilities, or any combination thereof. In some implementations, the approaches herein can be used to compare different changes under consideration, for example to compare one public cloud service against another cloud service. In some implementations, public cloud services or other changes are evaluated in isolation. That is, for example, if a company is considering using Public Cloud Provider X, the approaches herein can evaluate the attack surface of Public Cloud Provider X. In some implementations, public cloud services or other changes are evaluated within a larger context (e.g., within the context of an overall platform), which can include a plurality of computer systems, networking hardware, networks, and so forth. As an example, if a company is considering migrating from a self-hosted database system to a cloud-hosted database system, the approaches herein can evaluate changes in the attack service associated with moving the database system to the cloud, including, for example, interactions between the cloud-hosted database system and other systems within a platform. For example, a self-hosted application may have a need to connect to the cloud-hosted database system to retrieve and/or store information.

Addressing both zero day threats and attack surface changes are highly complex and time-consuming tasks and prone to significant delays, oversights, and errors. Organizations often have many, potentially hundreds or thousands, of applications, interactive web pages, and so forth. For example, a large organization may have hundreds or thousands of internal and external-facing applications. Thoroughly testing all of these using conventional approaches may simply not be feasible. Organizations may attempt to triage applications, focusing on the most critical applications while deferring evaluation of other applications. This can result in applications that are rarely, if ever, tested, and such applications can present a significant threat as they may be more likely to have undiscovered vulnerabilities.

When considering changes to an application, system, or platform, organizations may invest a large amount of resources before deciding whether or not to move forward. For example, patches or other software changes may undergo lengthy testing periods before being deployed. In the context of larger platform changes, such as migrations to cloud services or the integration of new backend software, evaluation processes can take months or years.

While the preceding and much of the following description focus on addressing security concerns, it will be appreciated that the approaches described herein are not so limited. For example, the approaches described herein can be used, additionally or alternatively, for identifying and/or mitigating stability issues, performance issues, and so forth.

There are many vulnerabilities that can affect computer systems, networks, etc., and new vulnerabilities emerge frequently, making it difficult to keep track of current vulnerabilities, take mitigation actions such as patching software or modifying network configurations, prioritize mitigation actions, and so forth. Some vulnerabilities can be easier to exploit than others. For example, some vulnerabilities may require detailed knowledge of various systems, may have certain library dependencies, may have certain network configuration dependencies, may depend on service configurations, and so forth. In some cases, even when a system is potentially vulnerable, this does not mean the vulnerability can actually be exploited, or it may be exceedingly difficult to exploit the vulnerability. For example, software installed on a server may have a vulnerability, but exploiting the vulnerability can be blocked by security controls such as permissions (e.g., remote access permissions, file access permissions, database access permissions, etc.), firewalls, etc. Additionally, different vulnerabilities can have different potential for adverse impacts. In some cases, the potential for adverse impacts can depend on how vulnerable software or hardware is used. For example, a vulnerability affecting a software library used for displaying promotional offers may be relatively inconsequential compared with another vulnerability in another software library (or even the same vulnerability in the same library) that is used for processing financial transactions.

Accordingly, it can be advantageous to conduct testing to determine which systems, networks, etc., are exploitable using a vulnerability. Manually preparing exploits to test for susceptibility to vulnerabilities can be a daunting task. Modern computing systems can include a wide variety of software, hardware, configurations, etc. Computing systems are often interconnected over networks that can include hardware such as switches, routers, load balancers, and so forth. There may be vulnerabilities related to hardware, software, networking equipment, and so forth. Vulnerabilities may be present on, for example and without limitation, servers, routers, switches, and/or end user devices such as smartphones, tablets, laptops, desktops, and so forth. Moreover, the threat landscape is constantly evolving, with old vulnerabilities being patched and new vulnerabilities being uncovered. In some cases, there may need to be different combinations of hardware, software, or both in order to successfully exploit a vulnerability. As an example, a vulnerability affecting certain Wi-Fi networking hardware may only be an issue if an end user device has not been patched, or a buffer overflow vulnerability in code running on a server may only be exploitable if an end user application is not updated to perform input validation that would prevent the submission of strings that could result in a buffer overflow. As another example, a vulnerability may rely on a misconfiguration for exploitation.

The vulnerability landscape can thus vary from end user to end user, depending upon, for example, the hardware, software, networks, and so forth used by end users to access a service, website, etc. Thus, it can be significant to conduct vulnerability testing that addresses the full breadth (or at least, a substantial portion thereof) of potential risks experienced by different users. Accordingly, the approaches described herein can be deployed to test company-controlled hardware, cloud infrastructure, networking equipment, and/or end user equipment. In some implementations, only some components may be tested. For example, vulnerability testing may be limited to servers or other cloud infrastructure, or can be limited to end user hardware, certain networking equipment, and so forth. The scope of vulnerability testing can depend on, for example, the particular vulnerability being tested, the potential for vulnerabilities on different devices, software applications, etc., to be used in combination to accomplish malicious activity, and so forth. Vulnerability testing can be further limited by the ability to conduct testing in a manner that does not overly adversely impact production systems. For example, some testing is conducted within a test environment, while other testing (e.g., testing that uses end user devices, cellular telecommunications services, etc.) may not be feasible to conduct entirely within a test environment. As an example, a particular wireless telecommunications company may use cellular hardware with a vulnerability, and it may not be feasible for individual companies to deploy similar cellular networking hardware for testing.

Patching vulnerabilities also carries significant risk for organizations. For example, a software or firmware update to address a vulnerability may introduce changes that break or compromise the functionality of systems, significantly impacts system performance, introduces compatibility issues, introduces other security vulnerabilities, and so forth. As an example, fixes to address the Spectre and Meltdown vulnerabilities resulted in noticeable performance degradation for certain workloads. In some cases, patches can introduce dependency conflicts, for example when shared libraries are used, can disrupt user activities, etc. In some cases, patches can result in data loss, or patch installation can fail, resulting in potentially complex recovery efforts. Thus, it can be important to test vulnerability patches thoroughly prior to deployment.

Vulnerability testing can help to identify vulnerabilities that could potentially affect production systems, interfere with user activity, and so forth. However, exploiting and patching vulnerabilities can require considerable knowledge and time. Thus, organizations may struggle to identify which vulnerabilities affect their systems, the potential impact of those vulnerabilities on their systems, the potential impacts of applying patches, and so forth. While security is critical to many businesses, there can be significant time and resource constraints that make thorough vulnerability testing and/or patch testing infeasible. As a result, organizations may fail to properly prioritize mitigation efforts, delay patching, etc., which can compromise security.

Analyzing vulnerabilities is often reactive, rather than proactive. That is, personnel may analyze logs, access patterns, etc., or may employ software that performs such analysis, may review software version information, and so forth. Such approaches can be valuable and can help to address many security issues. However, it can be significant to develop exploits and test for them before issues appear in production systems. Furthermore, even if issues have already appeared, it can be significant to perform testing that can help identify which systems are most at risk so that mitigation efforts can be undertaken in an orderly, prioritized manner, which can help limit any possible service disruptions. Determining a prioritization can be based on, for example, information contained on or accessible by an exposed system (also referred to herein as a vulnerable system) (e.g., personally identifiable information, financial information, etc.), potential impacts on system or service availability, potential abuse of the system to conduct fraudulent transactions (e.g., to create false records, false purchases, false financial transactions, etc.), and/or any other factor. In some implementations, a system can be configured to use Common Vulnerability Scoring System (CVSS) scores when determining prioritization. CVSS scores can factor in the impact of a vulnerability on confidentiality, integrity, and/or availability. Other scoring systems can also be used in addition to CVSS scores or as an alternative to CVSS scores.

As described herein, artificial intelligence/machine learning (AI/ML) models, such as large language models, can be used to generate exploits for testing vulnerabilities, to generate patches, to generate monitoring scripts, and/or for other security-related tasks, which can result in an improved security posture.

In some implementations, a large language model (LLM) is used to generate an exploit for one or more vulnerabilities, for example based on information obtained from one or more third-party security entities, such as common vulnerabilities and exposures (CVE) data. CVEs can be provided in a machine-interpretable format (e.g., JSON, CSV, HTML, etc.) and can include information such as a title, description, links to additional information, and so forth. In some cases, CVEs include relatively detailed information, such as affected versions, libraries, build configurations, and so forth. Alternatively, information may be less detailed but nonetheless useful, such as indicating that certain versions of software allow cross-site scripting, or may include somewhat more detailed information, such as indicating that a particular file in a larger package has a certain type of vulnerability or indicating that a particular field in a user interface can be used for SQL injection attacks. Some CVEs provide some guidance for how an exploit can be carried out, such as indicating that an authenticated user can perform a certain type of attack.

While much of this and the following discussion relates to CVEs, other data sources or types of data can be used additionally or alternatively, including data from third-party security entities, information collected by an organization, and so forth. In some implementations, information about prior vulnerabilities, exploits, etc., is used in generating exploits for vulnerabilities. For example, previous exploits and/or commonly known techniques are used by a system when generating an exploit for a different vulnerability.

Given the complexity of differing security vulnerability threat vectors included in security vulnerability descriptions, end-users of software applications are often unable to determine whether a particular software application is secure or otherwise safe to use. For example, end-users often take for granted that an application made available from a trusted entity (e.g., service provider, software developer, corporation, company, open source developer, etc.) does not include security vulnerabilities that may make the user's sensitive data prone to a data leak, man-in-the-middle attack, or other security vulnerabilities/attacks. However, as malicious entities continue to test these software applications and the computing platforms or systems that interact with such applications by penetration testing or other security exploit discovery techniques, oftentimes such malicious entities discover new security vulnerabilities and may exploit them leaving user data prone to being stolen. As such, end-users of software applications may not have accurate or up-to-date information as to whether a software application they intend to use is impacted by a security vulnerability as attackers are continually implementing newly discovered exploits in real-time or near real-time.

Additionally, although software development teams developing software applications for end-users typically test their applications for such security vulnerabilities, these testing methods are generally limited due to time and cost. This combined with platform updates (e.g., cloud-based service provider updates, operating system updates, or other platform-related updates) often create/uncover new security vulnerabilities. Additionally, software developers often utilize third-party libraries and other third-party code in their software. This third-party code may change over time and, if such third-party libraries are updated over time, the security landscape of a software application may change over time even if the developer has not made changes to their own code. Although third-party security entities may provide information related to newly discovered cybersecurity threats (e.g., security vulnerabilities, threat vectors, method of possible attack, etc.), such information is often generic and not specific to a given software application being executed on a given platform. In addition to the complex information of these cyber security threats, end-users, as well as software development teams are often unaware of how these threat vectors may impact specific aspects (e.g., data storage, cryptographic communications, networking, etc.) of the software they are developing with respect to the specific platform.

Another common issue faced by network engineers is with respect to the security of one or more computing system platforms, such as cloud-based computing system platforms (e.g., cloud-based service providers, cloud computing systems), mobile application platforms (e.g., iOS, Android, Windows), or other computing environments and their interactions with each other. For example, due to the complexity of current computing system architecture involving multiple computing system platforms being interconnected, selecting or designing a computing system platform to build a robust architecture for processing user data is a difficult task given the plethora of security vulnerabilities that may be associated with each computing system platform. For instance, when selecting or designing such computing system platforms that may process user data that is transferred from a mobile application of a mobile computing system platform to a cloud-based computing system platform, the network engineer must be aware of security vulnerabilities of each computing system platform. A large level of trust is often involved when selecting computing system platforms and network engineers must currently manually select which computing system platform to choose based on their opinion and what security-related information is available. However, such security information can be unreliable or outdated as new security vulnerabilities are discovered in real-time and/or masked via malicious use of AI, leading to a potential data leak of user data.

Yet another common issue faced by network engineers is with respect to providing accurate indications of security impact information of end-to-end computing systems, individual computing systems, individual software applications, etc. For example, in addition to the complexity of current computing system architectures, one security vulnerability present on a given computing component (e.g., a firewall, load balancer, server, etc.) may be associated or otherwise impact another security vulnerability present on another component (or the same component). Network engineers relying on their subjective opinion have no mechanism to accurately and consistently determine which security vulnerabilities are to be attended to over others, which security vulnerabilities impact other vulnerabilities, or which security vulnerabilities are most threatening or detrimental to user and system data. Although network engineers may perform research and rely on publicly available data concerning security vulnerabilities, updates to hardware or software within a computing system architecture may be updated, nullifying or rather amplifying the threat a given security vulnerability poses. Moreover, a network engineer may want to see at a higher level, which aspects of the computing system may be impacted by security vulnerabilities. For example, although security-vulnerability information may be directed to a single computing system component, that component may be part of a bigger picture (e.g., an aspect, category, or other class of computing system architecture). With no current mechanism to enable users (e.g., network engineers) to quickly and efficiently discover the most threatening security vulnerabilities and which aspects of an end-to-end computing system are impacted, delays in tending to security vulnerabilities may occur.

There is a need for determining, with respect to a given platform and the software being executed on the platform, how specific computing aspects (e.g., assessment domains) are impacted by a particular security vulnerability (or threat vector). There is a further need to convey this information in a user-friendly environment such that end-users are able to quickly and accurately determine whether a software application is safe to use. Moreover, there is a need to predict which computing aspects are impacted by security vulnerabilities (e.g., current security vulnerabilities or future security vulnerabilities) in real-time (or near real-time) to enable end-users to make informed decisions as to whether a software application the user intends to use is safe when new security vulnerabilities are discovered. Existing systems may provide generic security vulnerability-related information to software development teams, however, without determining how the generic security vulnerabilities impact different aspects of a specific platform with respect to the software application, the generic nature of the security vulnerability information is of minimal, if any, value and impact.

To overcome these and other deficiencies of existing systems, the inventors have developed a system for determining (i) what computing aspects of a software application executed on a given platform are impacted based on obtained security vulnerabilities (e.g., from a third-party security entity) and (ii) a visual indication of a level of impact for each computing aspect with respect to security vulnerabilities. For instance, the inventors have developed a specialized model that can determine, from a third-party security entity, security vulnerabilities that are specific to computing aspects of a software application being executed on a given platform. Using the obtained security vulnerabilities, the inventors have developed a method for determining a computing aspect impact level for each computing aspect of the software application with respect to the platform to enable users to make a clear and accurate determination to whether the software application is safe to use. Furthermore, the inventors have developed an improved user interface such that a user can easily identify whether the software application is safe to use based on a graphical representation of each computing aspect impact level with respect to the software application and the platform the software application is being executed on.

The inventors have further developed an improved method for determining comparative real-time end-to-end security vulnerabilities with respect to different infrastructure/architecture components, such as different cloud-based computing platforms, mobile computing system platforms, or other computing system environment components. The method determines a set of computing aspects associated with each respective component being compared (e.g., each cloud-based computing system platform) which can process a network operation in real-time (or near real-time). Using security-specification data and security vulnerability information associated with each component being compared, the system can determine computing-aspect impact levels compared to a comparative standard component being compared (e.g., a standard cloud-based computing system, a model cloud-based computing system, a guideline cloud-based computing system) to generate visual indications of each computing-aspect impact levels for each respective component to enable an easy identification of which component (e.g., cloud-based computing system) to choose. As such, by generating such visual indications, network engineers may select the "best" computing system platform based on up-to-date security vulnerability information to address user-specific requirements, such as to reduce the chance of a data breach of user data.

Due to the sheer number of variations of computing system platform-related security vulnerability information, there is a large amount of time spent attempting to identify how respective computing aspects are impacted by these complex combinations. For example, the hardware and software components that are associated with a given computing system platform may each be associated with their own respective security vulnerabilities which must be considered individually as well as how they impact one another when integrated with other computing system platforms. Furthermore, computer processing and memory resources are often wasted trying to identify how these computing aspects are impacted as existing systems and methods often rely on the software developer to perform hours-worth of research on the Internet, which leads to an increase in network traffic, an increase in computing memory required to process such requests, and wastes computer processing resources that could otherwise be available for other tasks, such as software development.

Additionally, as security vulnerabilities may be discovered in real-time by attackers, penetration testers, or hackers, security vulnerability information can be outdated, leading to the unidentified security vulnerabilities propagating throughout a given platform (e.g., a cloud-based computing system platform, cloud-based service provider, software application, mobile computing system platform, or other computing environment) for a long period of time, causing user data to be prone to a data breach or malicious software being installed to affect secure systems. Moreover, even when information is obtained with respect to each software application, platforms the software applications are executed on, the hardware and software components that control (or otherwise associated with the functions related to the software application), and the security vulnerabilities (e.g., of the hardware components, software components, and the platform), such information is often not in an easily understood format that may provide an overall "picture" of the end-to-end software application "health." This may lead to the software developer and/or end-user to misinterpret or simply miss any identified security vulnerabilities with respect to the software application due to the plethora of information. Thus, by optimizing the process in which specific computing aspects are identified in relation to a software application being executed on a given platform, determining a level of impact for each computing aspect, and providing a visual indication of such impact levels, the amount of computer processing and memory resources are decreased, as well as improving an end-user's understanding of the security of a software application they intend to use.

In various implementations, the methods and systems described herein can generate an improved graphical layout indicating computing-aspect-specific impact levels (e.g., as related to a software application and the platform the software application is being executed on) to indicate to an end-user a security profile associated with a software application in real-time. For example, a computing-aspect-mapping structure can be used to identify a set of computing aspects associated with a software application and the platform that the software application is being executed on. A set of security-vulnerability descriptions related to the platform (e.g., obtained by a security entity) is then obtained to determine a threat value for each security-vulnerability description by using a platform-specific policy that indicates security impact information related to the security-vulnerability descriptions. Computing aspect impact levels for each computing aspect associated with the platform can be determined using the determined threat value for each security-vulnerability description. A graphical layout can then be displayed at a user interface, where the graphical layout comprises a graphical representation of each computing aspect impact level of each respective computing aspect of the set of computing aspects associated with the platform.

In various implementations, the methods and systems described herein can generate an improved graphical layout indicating overall-computing aspect impact levels for associated computing aspects of one computing system platform with respect to a comparative computing system platform to indicate to a user (e.g., end-user, network engineer, or system administrator) that a given computing system platform is secure. For example, the system can detect a user interaction at a webpage for a network operation, where the network operation indicates a processing of data from one computing system platform to a set of other computing system platforms. The system can determine a first set of computing aspects associated with each computing system platform of the set of computing system platforms (e.g., the other computing system platforms) based on the processing of the network operation to obtain security-related information in real-time (or near real-time). The system then identifies a set of comparative computing system platform computing aspects (e.g., to compare each computing system platform to) to determine how one computing system platform "measures up" to a standard computing system platform. The system can then determine an overall-computing aspect impact level for associated (e.g., corresponding, matching, or otherwise similar) computing aspects of the comparative computing system platform computing aspects. The system can then generate at a GUI, a graphical layout indicating a graphical representation of each computing aspect impact level for each respective computing system platforms' computing aspect of the set of computing aspects to enable users to easily identify that a given computing system platform is secure and safe to use.

In the following description, for the purposes of explanation, numerous specific details are set forth in order to provide a thorough understanding of implementations of the present technology. It will be apparent, however, to one skilled in the art that implementation of the present technology can practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

FIG. 1 is a block diagram showing an illustration of components used to determine platform-specific end-to-end security vulnerabilities and a graphical layout for displaying the platform-specific end-to-end security vulnerabilities via a Graphical User Interface (GUI). In various implementations, system 100 can provide a software security label 106. The software security label 106 can display information in a graphical layout that is related to end-to-end software security of a platform-specific software application. For instance, end-to-end software security of a platform-specific software application may refer to the security measures (e.g., networking security mitigation techniques, networking security protection systems, etc.), security vulnerabilities (e.g., security threats, threat vectors, etc.) or other security information of a software application being executed on or with respect to a particular platform. As a software application may be executed on a variety of platforms, where each platform uses a combination of hardware components (and software components installed on the hardware) to host/run the software application, it is advantageous to understand the security of a given software application and whether the software application is safe to use. Logical component 102 can aggregate and analyze data from data sources/sub-models (e.g., agents 104) to generate for display a software security label 106 at a graphical user interface (GUI). Logical component 102 can be one or more of: a data model, a machine learning model, a computer program, or other logical components configured for receiving, transmitting, analyzing, or aggregating application- and/or processing-related data. Logical component 102 can analyze data received from agents 104 and generate a software security label for an end-user (e.g., a user, customer, unskilled user) to convey in an easily understood format whether a software application is safe to use. In some implementations, agents 104 can be a variety of data sources. For example, agents 104 can represent data obtained from one or more third parties (e.g., third-party security entities). Such third-party data sources may represent industry trusted globally accessible knowledge databases of adversary tactics and techniques that are based on real-world observations of security threats of various platforms and computer software. In some implementations, agents 104 can also be one or more machine learning models, deep-learning models, computing algorithms, or other data models configured to output security-related information of a platform and/or computer software. Logical component 102 can analyze data received by agents 104 to generate a graphical representation of end-to-end software security health such that an end-user (or alternatively, a software developer) can easily understand the safety of a software application being executed on a given platform.

Suitable Computing Environments

Figure 2:
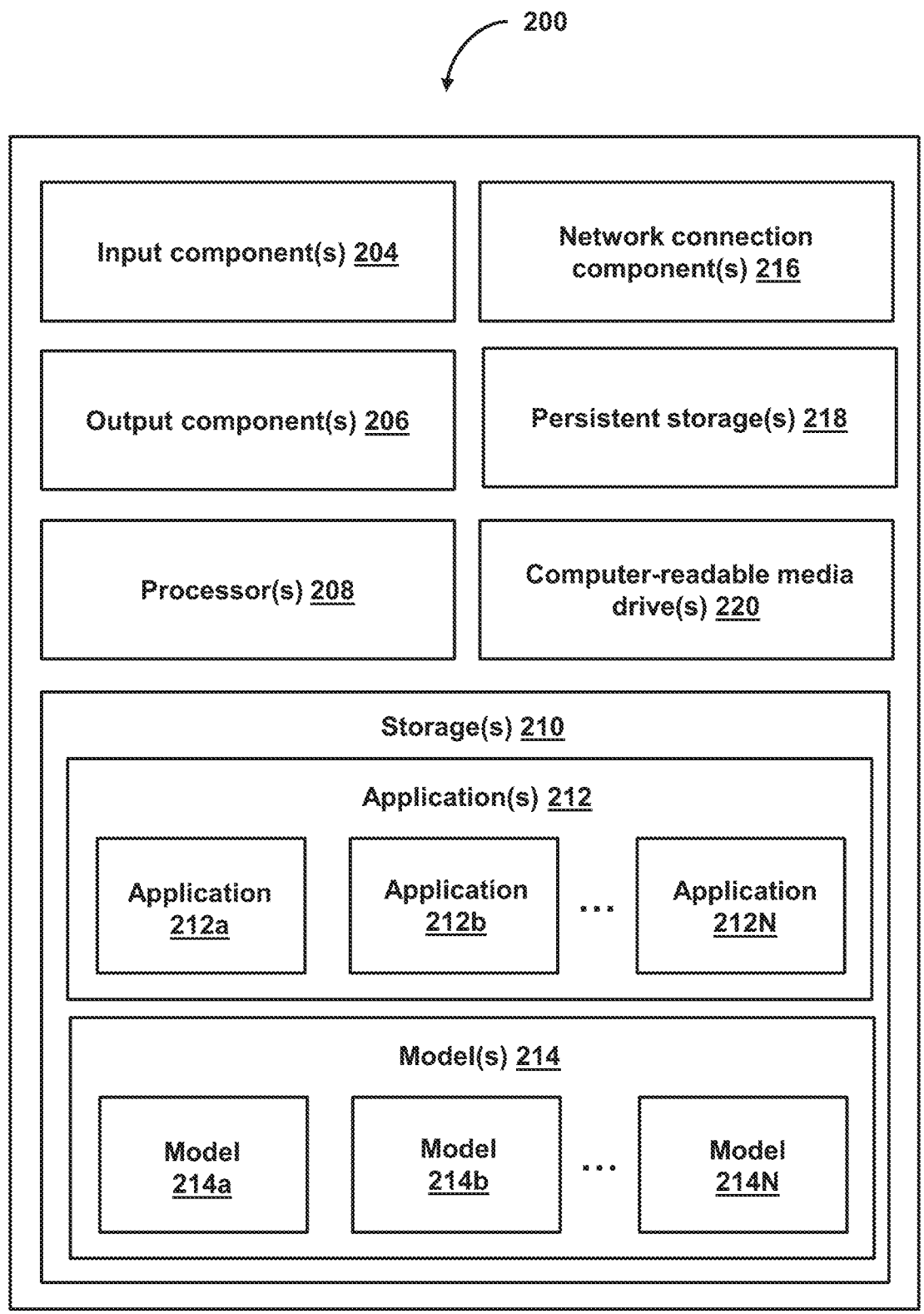
FIG. 2 is a block diagram showing some of the components typically incorporated in at least some of the computer systems and other devices on which the disclosed system operates.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, touch screens, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
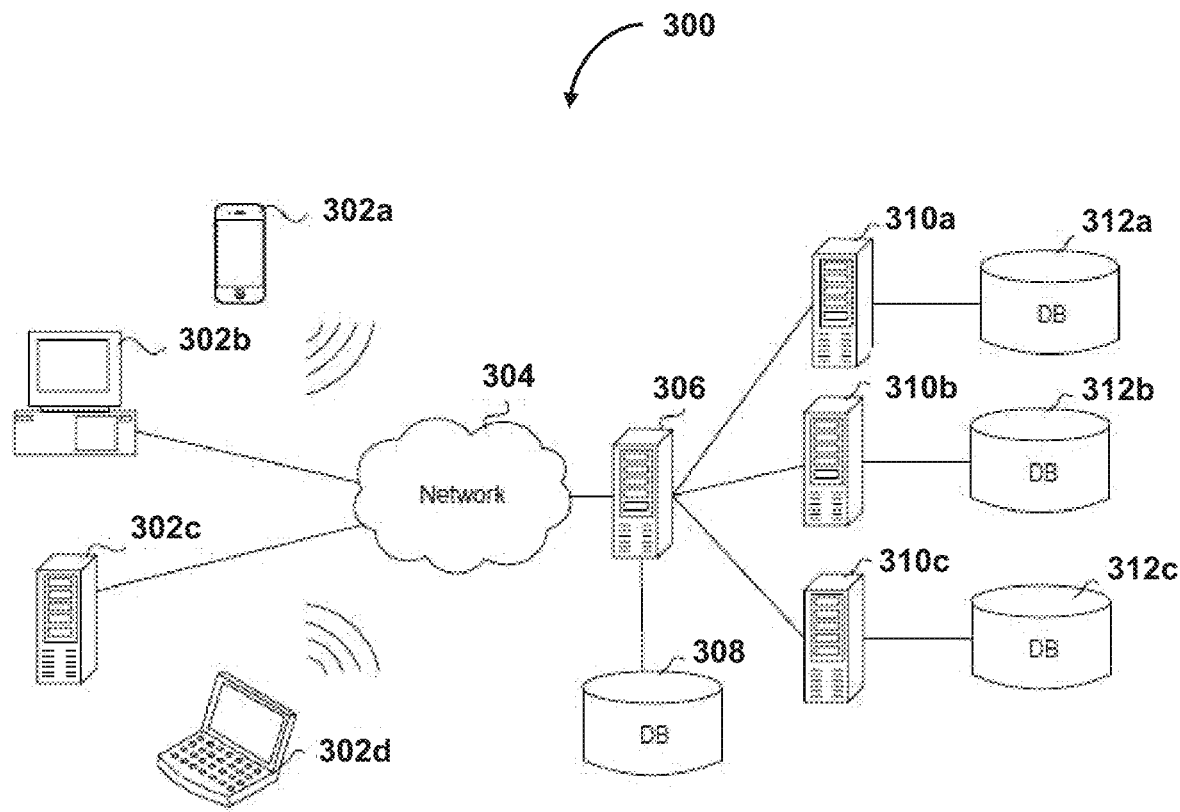
FIG. 3 is a system diagram illustrating an example of a computing environment in which the disclosed system operates in some implementation.

FIG. 3 is a system diagram illustrating an example of a computing environment in which the disclosed system operates in some implementation. In some implementations, environment 300 includes one or more client computing devices 302a-d, examples of which can host the system 100. For example, the computing devices 302a-d can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310a-c. In some implementations, server computing devices 306 and 310 comprise computing systems, such as the system 100. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310a-c) connect to a corresponding database (308, 312a-c). As discussed above, each server 310 can correspond to a group of servers, and each of these servers can share a database or can have its own database. Databases 308 and 312 warehouse (e.g., store) information such model data, training data, test data, validation data, one or more machine learning models, predefined ranges, predefined thresholds, error thresholds, graphical representations, computing-aspect-mapping structures (e.g., assessment-domain-mapping data structure), data structures, platform identifiers, software application identifiers, security-vulnerability descriptions (e.g., security-vulnerability responses, security threats, security attack vectors, tactics, techniques, and procedures), computing-aspect identifiers (e.g., assessment-domain identifiers), platform-specific policies, mathematical formulas (e.g., weighted average, weighted sum, or other mathematical formulas), graphical elements (e.g., colors, shapes, text, images, multimedia), system protection mechanisms, networking routes, network processing routes, mitigated threat values, mitigated-computing-aspect-impact levels, computing-aspect-specific-impact levels, industry scoring standards, predetermined security threat values, received agent 104 information (FIG. 1), or other information.

The one or more machine learning models can include supervised learning models, unsupervised learning models, semi-supervised learning models, and/or reinforcement learning models. Examples of machine learning models suitable for use with the present technology include, but are not limited to: regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), decision engines, rules engines, Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), blackboard machine learning models, and ensemble algorithms (e.g., boosting, bootstrapped aggregation, AdaBoost, blending, stacking, gradient boosting machines, gradient boosted trees, random forest).

In various implementations, the one or more machine learning models can be trained on training data or a training set (discussed in more detail below in relation to FIG. 4). The training data or training set can be created by generating pairs of features (e.g., feature vectors) and/or ground-truth labels/values based on any of the data stored in databases 308 and 312. During training, the machine learning models can be adjusted or modified to fit the models to the training data by, for example, adjusting or modifying model parameters, such as weights and/or biases, so as to minimize some error measure (e.g., a difference between a predicted value and an actual/ground-truth value) over the training data. The error measure can be evaluated using one or more loss functions. Examples of loss functions that can be used include, but are not limited to, cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can then be applied to test data or validation data (e.g., holdout dataset) to generate predictions (e.g., predicted values or labels). The test data or validation data can also come from data that is stored in databases 308 and 312 (e.g., unlabeled data to generate predictions for). In some implementations, the machine learning models can be retrained to further modify/adjust model parameters and improve model performance. The machine learning models can be retrained on existing and/or new training data, training data, or validation data so as to fine-tune the model parameters to better fit the data and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN), but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Machine Learning Model(s)

Figure 4:
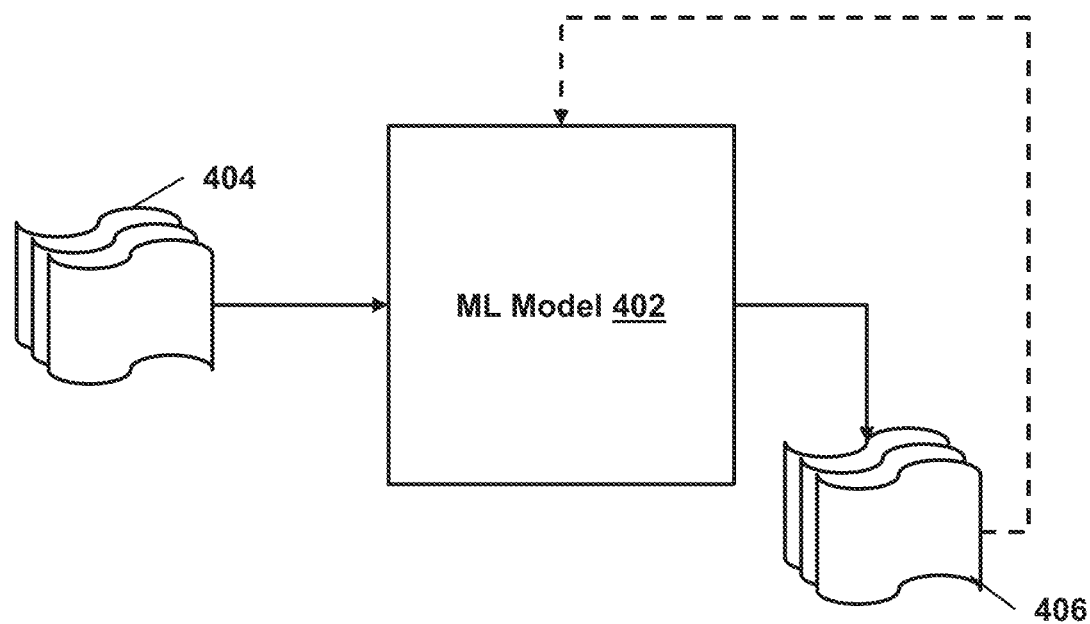
FIG. 4 is an illustrative diagram illustrating a machine learning model, in accordance with some implementations of the present technology.

FIG. 4 is an illustrative diagram illustrating a machine learning model, in accordance with some implementations of the present technology. In some implementations, machine learning model 402 can be part of, or work in conjunction with logical component 102 (FIG. 1). For example, logical component 102 can be a computer program that can use information obtained from machine learning model 402. In other implementations, machine learning model 402 may represent logical component 102, in accordance with some implementations of the present technology.

In some implementations, the machine learning model 402 can include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some implementations, each individual neural unit may have a summation function which combines the values of all its inputs together. In some implementations, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some implementations, neural networks may include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free flowing, with connections interacting in a more chaotic and complex fashion.

As an example, with respect to FIG. 4, machine learning model 402 can take inputs 404 and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some implementations, machine learning model 402 can be trained based on information stored in database 308 or database 312 to generate predictions related to mapping platform identifiers to one or more computing aspects. For example, database 308 may include information related to one or more platform identifiers, software application identifiers, security vulnerability information (e.g., security threats, tactics, techniques, and procedures (TTPs), or other security vulnerability information), security protection mechanisms (e.g., firewalls, encryption standards, hardware security module identifiers, communication protocols, system security policy information, or other security protection measure-related information), computing aspect identifiers (e.g., assessment-domain information, etc.) or other information. As an example, machine learning model 402 may be trained on one or more predetermined computing-aspect-mapping structures such that, when new information is provided to the machine learning model as inputs, machine learning model 402 may generate an updated or "new" computing-aspect-mapping structure that indicates a mapping of platforms to computing aspects involved with a processing of network operations. For instance, the computing-aspect-mapping structure can represent a data structure that maps platform identifiers (e.g., a cloud-based platform, a mobile application platform, third-party hosted platform, or other ecosystem of computing resources) to one or more computing-aspects (e.g., assessment domains). For example, the computing-aspect mapping structure may can be a table, graph, directed graph, array, or other data structure configured to include information related to platforms, security vulnerability descriptions, computing aspects, or other information. For instance, the computing-aspect-mapping structure may map platform identifiers to one or more computing aspects involved with a processing of network operations.

Computing-aspects may refer to any aspect of a computing system that is involved in a processing of data. For instance, a computing-aspect may be data storage, cryptography, platform usage, network, remote attestation, or other computing-aspect that is involved during the use of a software application being executed on a platform. Such computing-aspect-mapping structure can be generated to determine which computing aspects are involved with a given platform/software combination. As every software application is executed on a given platform, such as a cloud-based platform, each platform may be associated with a set of hardware and software that forms the "base layer" for a software application (e.g., as developed by one or more software developers) to be executed "on-top" of. Therefore, to accurately determine whether a software application is "safe" to use, it is important to determine which computing aspects are related to a particular platform and how the hardware/software combinations of that particular platform may impact the overall security of the software application being executed on the platform. As such, in some implementations, machine learning model 402 may be configured to generate a computing-aspect-mapping structure that may map one or more platform identifiers to one or more computing-aspects involved with a processing of data (e.g., execution of a software application) to determine a computing-aspect impact level (or assessment-domain impact level) for each computing-aspect associated with the platform.

For example, machine learning model 402 can take a first set of information as input 404. The first set of information can include platform identifiers, security vulnerability descriptions, one or more computing aspects, or other information. For example, the platform identifiers may indicate a respective platform that a software application is associated with (e.g., cloud-based application, mobile application, operating system), an identifier identifying an ecosystem of computing resources associated with the software application, or other platform identifier. The security vulnerability descriptions may indicate security vulnerability information, security threats, security attack vectors, TTPs, or other security vulnerability-related information. In some implementations, the security vulnerability descriptions may be obtained from one or more third-party security entities (e.g., a computing security related entity that provides computing threat related information, such as Mitre® or NIST®). Additionally, the one or more computing aspects may indicate predetermined categories that are related to one or more computing related aspects that are involved with a processing of network operations. As an example, the computing aspects may indicate assessment-domains, indicating a category of a process, procedure, or usage of computing function when data is processed by a computer. For instance, an assessment domain may indicate a "platform usage," "data storage," "network," "cryptography," "remote attestation," or other assessment domain. Such assessment domains may be a predetermined label to an aspect of computer functionalities related to processing network operations.

Machine learning model 402 can take the first set of information as input 404 and generate a computing-aspect-mapping structure as output 406. the computing-aspect-mapping structure may indicate a mapping of computing aspects mapped to one or more platform identifiers. For instance, prior to generating a computing-aspect impact level for each computing aspect associated with a given platform and the software application being executed on the platform, it is advantageous to determine which computing aspects are involved with the given platform. In this way, the system can later use the security vulnerability descriptions to determine how "big" or "how important" a given threat is to a specific computing aspect. Machine learning model 402 can use the security vulnerability descriptions and the platform identifiers to learn associations between the security vulnerability descriptions and the platform identifiers with respect to the predetermined computing aspects to correctly map a security vulnerability to a platform identifier. In some implementations, output 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, a predetermined computing-aspect mapping, or other information).

In some implementations, machine learning model 402 can be trained based on information stored in database 308 or database 312 to generate predictions related determining threat values. As an example, a threat value may be any value indicating a level of a threat. For instance, a threat value may indicate a level of risk associated with a given security vulnerability, security vulnerability description, or other security vulnerability information. Machine learning model 402 can take a second set of information as input 404. The second set of information can include platform identifiers, security vulnerability descriptions, one or more computing aspects, a platform-specific policy, or other information. As an example, the platform-specific policy can indicate security impact information related to security-vulnerability descriptions. For instance, the platform-specific policy can indicate threat-aspects (e.g., threat information included in the security vulnerability descriptions) that are deemed significant to a given entity. The entity may be a service provider, company, corporation, merchant, or other entity. The entity may have a set of rules, procedures, or other guidelines/policies for handling security threats and/or security vulnerabilities that are important to the operation of one or more computing systems related to the entity as well as one or more computing aspects that are important to the one or more computing systems. As such, the platform-specific policy may act as a governing document for a particular computing platform of the entity that is associated with the handling of one or more threats, threat values, or threat mitigation values. In some implementations, the platform-specific policy may include one or more values that are assigned to security vulnerabilities and the respective computing aspects that are associated with the one or more values. As such, machine learning model 402 may use the platform-specific policy to determine or otherwise generate a threat value indicating a "threat level" (e.g., an impact of a security-vulnerability) that is specific to the entity, the associated computing platform of the entity, and the computing aspects associated with the computing platform of the entity. As an example, the entity may include various computing platforms to provide one or more services to an end-user. The entity may "care" more about a particular security vulnerability related to cryptography in a cloud-based platform/environment as opposed to the same vulnerability in a mobile application-based platform/environment. As such, the policy may indicate to give a "higher weight" to the threat value of the security vulnerability related to cryptography in the cloud-based platform/environment and give a lover weight to the same vulnerability in the mobile application-based platform/environment. In some implementations, the threat value may be a quantitative value, such as an integer, percentage, ratio, decimal value, or other quantitative value. In some implementations, the threat value may be a qualitative value, such as "high," "medium," "low," "yes," "no," or other qualitative value.

Machine learning model 402 can take the second set of information as input 404 and generate a threat value of each security vulnerability description as output 406. For instance, the machine learning model 402 can use the platform-specific policy to determine a threat value for each security vulnerability description with respect to each computing aspect of the entity's computing system by learning associations between a platform identifier, the information included in security vulnerability descriptions, the information included in the platform-specific policy, and the one or more computing aspects. In this way, the system may later use the threat values of each security vulnerability descriptions to determine how "big" or "how important" a given threat is to a specific computing aspect that is specific to the computing platform/environment of the entity. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined threat values, or other information).

In some implementations, machine learning model 402 can be trained based on information stored in database 308 or database 312 to generate predictions related determining computing aspect impact levels (e.g., assessment-domain impact levels). For example, machine learning model 402 can take a third set of information as input 404. The third set of information can include platform identifiers, security vulnerability descriptions, one or more computing aspects, a platform-specific policy, one or more impact level measures, or other information. As an example, the one or more impact level measures may indicate how to "measure" or otherwise "generate" a computing aspect impact level. For instance, the impact level measures may indicate one or more algorithms, weights, ratios, values, or mathematical formulas to serve as a basis for generating a normalized impact level. In some implementations, a computing aspect level may be a quantitative value, such as an integer, percentage, ratio, decimal value, or other quantitative value. In some implementations, the computing aspect level may be a qualitative value, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the third set of information as input 404 and generate a computing aspect impact level for each computing aspect of a set of computing aspect as output 406. For instance, the machine learning model 402 can use the impact level measures by learning associations between a platform identifier, the information included in security vulnerability descriptions, the information included in the platform-specific policy, the one or more computing aspects, and the impact level measures. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is at an acceptable risk for use. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

In some implementations, machine learning model 402 can be trained based on information stored in database 308 or database 312 to generate predictions related determining mitigated-computing-aspect impact levels (e.g., mitigated-assessment-domain impact levels). For example, machine learning model 402 can take a fourth set of information as input 404. The fourth set of information can include platform identifiers, security vulnerability descriptions, one or more computing aspects, a platform-specific policy, one or more impact level measures, system protection measure information, mitigated threat values, or other information. As an example, the one or more system protection measure information can indicate information related to a protection system associated with a given platform and software being executed on the platform with respect to an entity. For instance, an entity may employ one or more computing system protection measures to mitigate one or more computing-related threats, attacks, or other computing/network related threats. Such protection measures can include, but are not limited to firewalls, cryptographic communication standards, hardware security modules, honeypots, intrusion detection systems, scareware, proxy servers, software updates, hardware updates, or other cybersecurity related software/hardware protection measures. In some implementations, the system protection measures can be specific to a given platform (e.g., via a platform identifier). For instance, in a cloud-based platform/environment, the entity may employ one or more proxy servers whereas in a mobile-application based platform/environment, a hardware security module may be employed. It should be noted that any combination may exist, and such examples are merely exemplary. In some implementations, each system protection measure may be assigned a predetermined mitigated-threat-value. For example, each system protection measure may be assigned an "offset" value configured to "offset" a threat level of a security vulnerability. For instance, where a known security vulnerability of a cryptographic communication attack vector is known in a cloud-based environment, where an entity is employing a firewall, the threat value associated with the cryptographic communication attack vector may be mitigated. As such, the system may assign the threat value to the mitigated threat value to "lower" the impact level/threat level as the security vulnerability has been mitigated by the firewall. That is, the mitigated threat value level may be lower than that of the threat level currently assigned to the security vulnerability (e.g., as the entity is employing a firewall that has an effect on the attack vector). In some implementations, the mitigated threat value and the mitigated-computing-aspect-impact level may be quantitative values, such as an integer, percentage, ratio, decimal value, or other quantitative value. In some implementations, the mitigated threat value and the mitigated-computing-aspect-impact level may be qualitative values, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the fourth set of information as input 404 and generate a mitigated threat value and/or mitigated-computing-aspect impact level for each computing aspect of a set of computing aspect, with respect to a security vulnerability as output 406. For instance, the machine learning model 402 may use the system protection measures by learning associations between a platform identifier, the information included in security vulnerability descriptions, the information included in the platform-specific policy, the one or more computing aspects, and the impact level measures, the system protection measures, or other information. In this way, the system may later use the mitigated threat values and the mitigated-computing-aspect impact levels to generate an easily understood graphical representation of mitigated-computing-aspect-impact levels. By doing so, end-users, as well as software developers, may easily view a software security label to understand whether an entity is mitigating any known security vulnerabilities, thereby improving the user experience and increasing user trust. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined mitigated-computing-aspect-impact levels, predetermined mitigated threat values, or other information).

In some implementations, machine learning model 402 can be a blackboard machine learning model. A blackboard machine learning model can represent a blackboard architectural model where a common knowledge base (e.g., the "blackboard") is updated by differing data sources (e.g., agents 104 (FIG. 1)). For instance, the blackboard machine learning model may be configured with a first problem (e.g., generate computing aspect impact levels for a set of computing aspects associated with a platform for a software application). The blackboard machine learning model may use information supplied by the data sources (e.g., one or more agents, interactive agents, interactive models, artificial intelligence models, machine learning models, etc.) to update the blackboard machine learning model with one or more partial solutions. In some implementations, the data sources may "publish" information to the blackboard machine learning model. When publishing information to the blackboard machine learning model, an agent or other data source may obtain information associated with the blackboard machine learning model (e.g., historical information uploaded to the blackboard machine learning model, relevant information associated with the agent, prior partial solutions, etc.) and may update the blackboard machine learning model with new information. As such, the data sources and the blackboard machine learning model work together to solve the first problem. In some implementations, where machine learning model 402 is a blackboard machine learning model, machine learning model 402 may take a fifth set of information as input 404 and generate a computing aspect impact level for each computing aspect of a set of computing aspect as output 406.

As an example, the fifth set of information may include platform identifiers, security vulnerability descriptions, one or more computing aspects, a platform-specific policy, one or more impact level measures, or other information obtained from agents 104 (FIG. 1). For instance, the machine learning model 402 may use the input information (e.g., input 404) to learn associations between the input information (e.g., thereby generating partial solutions), and may also iteratively update the blackboard model based on new input information to generate outputs 406 indicating computing aspect impact levels for each computing aspect of a set of computing aspects associated with the platform. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is safe to use. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

In some implementations, machine learning model 402 can be trained based on information stored in database 308 or database 312 to generate predictions related to generating a set of impacted computing-aspects (e.g., impacted assessment-domains). For example, machine learning model 402 can take a sixth set of information as input 404. The sixth set of information can include platform identifiers, security vulnerability descriptions, one or more computing aspects, one or more impact level measures, set of labeled feature vectors, computing system component identifiers, impacted-computing aspects, or other information. For example, the set of labeled feature vectors may indicate labels of (i) a given security vulnerability, (ii) a given computing system component, and/or (iii) a given impacted computing-aspect. Each feature vector of the set of labeled feature vectors may include a labeled security vulnerability, a labeled computing system component (e.g., identifying information of hardware or software associated with the computing system component), and labeled impacted computing-aspect such that each of the labels correspond to (or are otherwise associated with) one another. The feature vectors may be based on historically derived information indicating which security vulnerabilities affected a given computing system component, and which computing aspect (e.g., of a computing system/platform) was impacted by such. Leveraging this unique and robust training data, machine learning model 402 may be trained to generate accurate predictions determining a set of impacted computing-aspects.

Machine learning model 402 can take the sixth set of information as input 404 and generate a set of impacted computing-aspects as output 406. For instance, the machine learning model 402 may use the sixth set of information to learn associations between security vulnerabilities, computing system components, and impacted computing-aspects to generate a set of impacted computing-aspects when provided a set of security vulnerabilities. In this way, the system may later use generated set of impacted computing-aspects to generate an easily understood graphical representation of impacted computing-aspects, enabling users to quickly identify which aspects of a given computing-system is at risk of a security exploit. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined impacted-computing aspects, or other information).

In some implementations, machine learning model 402 can be trained based on information stored in database 308 or database 312 to generate predictions related generating a set of security mitigation actions. For example, machine learning model 402 can take a seventh set of information as input 404. The seventh set of information can include platform identifiers, security vulnerability descriptions, one or more computing aspects, a platform-specific policy, one or more impact level measures, system protection measure information, mitigated threat values, a second set of labeled feature vectors, or other information. For example, the second set of labeled feature vectors may indicate labels of (i) a given impacted computing-aspect, (ii) a given security vulnerability, and (iii) a given security mitigation action. Each feature vector of the set of labeled feature vectors may include a labeled impacted computing-aspect, a labeled security vulnerability (e.g., security vulnerability descriptions, security vulnerability responses, etc.), and labeled security mitigation action such that each of the labels correspond (or are otherwise associated with) one another. The feature vectors may be based on historically derived information indicating which security vulnerabilities affected a given computing-aspect, and which mitigation actions resolved the computing-aspect's security vulnerability.

The mitigation action may be an action that resolves or inhibits a security exploit related to the security vulnerability. In some implementations, mitigation action(s) may be based on a platform-specific policy that is described later. For example, mitigation action(s) for a platform usage computing-aspect may be "Ensure application detects Root or Jailbreak device and informs/restricts on app launch; Ensure only latest software version supported for app so as to leverage the native benefits and its security updates; ensure on latest software versions supported to align with OS security patches," or other information such as "install software version X.XX." Mitigation action(s) for a data storage computing-aspect may be "Do not store any sensitive data in clear on local device especially under external storage; Ensure application detects Root or Jailbreak device and informs/restricts on app launch; If sensitive data needs to be stored on client, then ensure encrypted storage is implemented; Avoid writing data on external storage due to global accessibility; Use clearCache to delete any sensitive data stored through webview; Explicitly mark allowBackup, debuggable as false," or other mitigation actions. Mitigation action(s) for a cryptography computing-aspect may be "Ensure application uses only entity approved encryption/signing/hashing methods; Only standard and approved protocols should be used to exchange symmetric keys between client app and server for secure communication; Ensure signature generation on client should leverage SE/TEE only; Ensure app does not rely on symmetric cryptography with hardcoded keys as sole method of encryption; Ensure app does not re-use the same cryptographic key for multiple purposes; All random values generated using a secure random number generator," or other mitigation actions. Mitigation actions for a computing-aspect of network communication may be "enforce HTTPS (TLS) for connections for any domain; Enforce application encryption on top of TLS; App checks invalid certificate and should not be allowed to continue despite a certificate error; Implement whitelisting of domains at app and validation at server; Ensure only entity recommended ciphers are configured; Implement certificate pinning and validation at network change; Implement Certification revocation list checks within app," or other mitigation actions. Mitigation action(s) for a computing-aspect of client code integration may be "ensure no application or third-party library or code are downloaded into application at run time; all dependent SDKs, Frameworks, Libraries should be embedded into application before packaging," or other mitigation actions. It should be noted that not all computing-aspects (e.g., assessment-domains) and mitigation actions for determined security vulnerabilities are disclosed; others exists and those listed above are illustrative.

Machine learning model 402 can take the seventh set of information as input 404 and generate a set of mitigation actions as output 406. For instance, the machine learning model 402 may use the seventh set of information to learn associations between security vulnerabilities, computing system components, impacted computing-aspects, and mitigation actions to generate a set of mitigation actions when provided a set of impacted computing-aspects and a set of security vulnerabilities impacting the respective impacted computing-aspects. In this way, the system may later use generated set of mitigation actions to enable a user to quickly correct security vulnerabilities impacting a given computing system. Additionally or alternatively, the system may later use generated set of mitigation actions to configure a network component to automatically apply one or more mitigation actions to correct security vulnerabilities impacting the computing system/platform, thereby increasing networking and computing security. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined mitigation actions, etc.).

Zero Day Discovery

Evaluating known vulnerabilities and taking mitigation actions to address them are important for securing applications, systems, and platforms. However, these approaches are generally reactive, in that evaluation, testing, patching, and so forth are only carried out after a vulnerability is discovered and possibly exploited. To stay ahead of threat actors, early discovery of vulnerabilities can be important. As described herein, vulnerability discovery can be a difficult, time consuming, error-prone, and oftentimes fruitless process if done manually. The approaches described herein can improve computer security by discovering unknown vulnerabilities. In some implementations, the approaches herein can be used for continuous vulnerability discovery.

The discovery of vulnerabilities typically involves one or more of various techniques and methodologies, such as static analysis, dynamic analysis, code analysis, network activity analysis, and so forth. These techniques and methodologies can produce various data, generally referred to as application analysis data herein. Application analysis data can include data obtained via static analysis, dynamic analysis, source code analysis, network activity analysis, and/or any other suitable analysis technique.

Static analysis tools can analyze executable code files to identify functions used, libraries used, possible code execution paths, embedded strings (e.g., hardcoded credentials), and so forth. Code analysis tools can analyze source code to identify potential security flaws, such as unsanitized inputs, buffer overflows, race conditions, improper error handling, hard-coded credentials, and so forth. In some implementations, software such as a linter is used to identify potential security vulnerabilities, such as the use of deprecated or insecure functions, injection vulnerabilities, input sanitization issues, hardcoded credentials, and so forth.

Dynamic analysis tools can monitor programs during execution to determine the actual behavior of programs when they are executed. This can be beneficial because it shows how programs actually behave but may not be exhaustive because certain possible execution paths may not be followed, for example depending on the inputs provided to the program. Moreover, programs may behave differently in different environments. In some cases, more advanced malicious software can behave differently if it detects that it is likely running in a test environment, such as in a virtual machine.

Dynamic analysis can include the use of techniques such as fuzzing. Fuzzing can involve generating a range of inputs, which can be random, semi-random, or based on pre-defined patterns. Fuzzing can be used to test a program's ability to handle a range of inputs, which can include unexpected or malformed data. Fuzzing can come in various forms, such as file format fuzzing (e.g., altering headers or corrupting data in files), network protocol fuzzing (e.g., passing malformed, oversized, or invalid headers, methods, parameters), API fuzzing (e.g., passing calls with missing or extra fields, invalid data types, very large arguments), command line fuzzing (e.g., long argument strings, invalid options, special characters, escape sequences), database fuzzing (e.g., malformed queries, SQL injection payloads, invalid data types), memory fuzzing (e.g., inputs to cause large memory allocations or induce buffer overflows), and so forth. These are merely examples, and it will be appreciated that fuzzing can be employed in a wide range of scenarios.

Another dynamic analysis technique can include network monitoring. For example, a network monitoring tool can monitor for unusual network access patterns (e.g., an application scanning for open ports when there is no reason for it to do so, or searching for file shares when there is no reason for the application to access file shares). In some implementations, the network monitoring tool can detect security issues such as the use of insecure protocols (e.g., FTP, telnet), plain text credential passing, and so forth.

Vulnerability discovery can be carried out using various levels of information. The various levels can be generally categorized as black box, gray box, and white box. In black box testing, testers are not provided with any information about an application, system, or platform, and attempt to identify vulnerabilities in the system or platform. This presents a significant hurdle as attackers may need to figure out some information about the platform (e.g., what software is running on the platform) in order to proceed. This can simulate how an external threat actor with no a priori knowledge of a system or platform could go about uncovering vulnerabilities.

In gray box testing, testers have limited knowledge of the application, platform, or system. For example, testers may be given some information such as operating system, type of software (e.g., web server software, database server software), libraries used (e.g., a tester may know that an end user application utilizes the Electron framework), and so forth, which can provide some initial direction for discovering vulnerabilities. In some cases, external threat actors can derive some knowledge by, for example, perusing engineering blogs, published patent applications, and so forth, which can provide information about platform configuration, software used, and so forth.

In white box testing, testers have full or nearly full knowledge of an application, platform, or system, which can include information about system or platform architecture, specific software or operating system information, and so forth. In some cases, white box testers can have access to source code for applications running on the system or platform. Such testing can be highly valuable as it can enable the easiest discovery of vulnerabilities, though it may not be reflective of typical approaches used by external threat actors who typically do not have access to such information (though in some cases, they may have significant information, for example if an organization posts source code to a publicly available repository).

In some implementations, the approaches herein can provide for vulnerability prioritization. In some implementations, the approaches herein can prioritize vulnerabilities based at least in part on how they are discovered. The prioritization can reflect a relative importance of addressing different vulnerabilities. For example, vulnerabilities discovered through black box testing can be prioritized over vulnerabilities discovered through gray box testing, which can be prioritized over vulnerabilities discovered through white box testing. This can be significant because vulnerabilities discovered using black box testing may be relatively easy for threat actors to discover without much or any knowledge of a target system or platform, and thus it can be more likely that a nefarious actor could discover and exploit such a vulnerability. On the other hand, vulnerabilities discovered via white box testing may be less likely to be uncovered and exploited by threat actors who typically do not have detailed knowledge of a system or platform. It will be appreciated that other factors can influence prioritization. For example, a gray box attack that has a high potential for data theft may be prioritized over a black box attack that is expected to have relatively minor impacts, such as an application crash.

New vulnerabilities are often discovered based on or informed by previous vulnerabilities. For example, vulnerability hunters may look for vulnerabilities that are similar to those that have previously been discovered. Similarly, exploits for vulnerabilities, which are described in more detail herein, also are often based on or informed by previous exploits. Vulnerability hunters may leverage existing knowledge about tactics, techniques, and procedures (TTPs) to identify vulnerabilities or develop exploits for vulnerabilities. Such an approach can enable vulnerability hunters (and threat actors) to refine their methods and adapt to a changing security landscape, while utilizing existing knowledge. One source of TTP information is the MITRE® ATT&CK® platform. In some implementations, TTP information is accessed and used to help guide vulnerability discovery. This can make discovery of vulnerabilities more likely. In some implementations, such information is not used, which may help to discover more unique vulnerabilities that use TTPs that differ more significantly from existing TTPs.

As described herein, discovering vulnerabilities can be a time consuming task that requires significant expertise, and even then, it can be a difficult and often fruitless endeavor. Any particular vulnerability test can have a low likelihood of uncovering a vulnerability. In some implementations as described herein, machine learning models can be used for vulnerability discovery. Machine learning models can include large language models (LLMs), other types of models, or both. Some implementations utilize a single model, while other implementations utilize an ensemble of models. In an ensemble approach, different models can be configured to perform different tasks or subtasks, as described herein. In some implementations, a coordinator model or coordinator application is used to process outputs of the ensemble of models, for example to make a determination about the outputs, such as a likelihood that a vulnerability has been discovered.

In some implementations, a machine learning model (e.g., an LLM) is trained using training data which can include, for example and without limitation, published TTPs, published vulnerabilities, published exploits, source code, documentation, security information such as blog posts or articles, and so forth. In some implementations, such information is not used to train the model but is made available to the model at runtime. For example, a system can be configured to use retrieval augmented generation, which can provide contextual information, in running a model. For example, a system can access such information and generate embeddings for the information. In some embodiments, relevant information can be determined based on a comparison of an embedding generated for a model input (e.g., a prompt for an LLM) and the embeddings for the information. The comparison can be based on various metrics, such as L1 distance, L2 distance, cosine similarity, or any other similarity metric. The most relevant information can be used to augment an input (e.g., to add to a prompt) which can provide information for the model (e.g., LLM) to use in generating an output. RAG can be useful even if the model is trained using security-related training information, as RAG can enable the model to utilize up-to-date security information that may not have been included in the data used to train the model.

Different models can be better suited to different tasks. moreover, breaking down a large task, such as searching for vulnerabilities in an application, system, or platform, can be important as models typically have limited context windows or other limitations that make tackling large, complex problems difficult and prone to errors. In some implementations, as described herein, an ensemble of models is used for vulnerability discovery. In some implementations, different models are used for different assessment domains. For example, different models can be used for different assessment domains such as networking, credentials, encryption, third-party integrations, input validation, etc. In some implementations, different models are used for different vulnerability discovery techniques. For example, different models can be used for processing dynamic analysis data, static analysis data, source code analysis data, network monitoring data, etc. In some implementations, other divisions and/or subdivisions are used. For example, within static analysis data, one model can be used for analyzing execution paths and another can be used for analyzing strings.

The machine learning techniques described herein can be used to identify potential vulnerabilities, but these vulnerabilities may or may not be real vulnerabilities. For example, suspicious network activity may in fact be benign, or a potentially vulnerable code execution path observed in static analysis data may not be of concern if the execution path is never executed. Accordingly, potential vulnerabilities can be evaluated to determine if they are real vulnerabilities. For example, as described in more detail herein and in co-pending U.S. patent application Ser. No. 18/792,523, filed Aug. 1, 2024, a system can be configured to generate and test exploits for a vulnerability or potential vulnerability. It will be appreciated that if an exploit is successful, the potential vulnerability is a real vulnerability, but the opposite is not true (e.g., the fact that a potential vulnerability was not successfully exploited does not mean that the potential vulnerability cannot be exploited). In some implementations, the complexity of an exploit, ease of developing an exploit, etc., can be used in determining a vulnerability ranking for the vulnerability. For example, if a vulnerability is easily exploited, this can be used to determine a relatively higher vulnerability ranking than if the vulnerability is very difficult to exploit.

Figure 5:
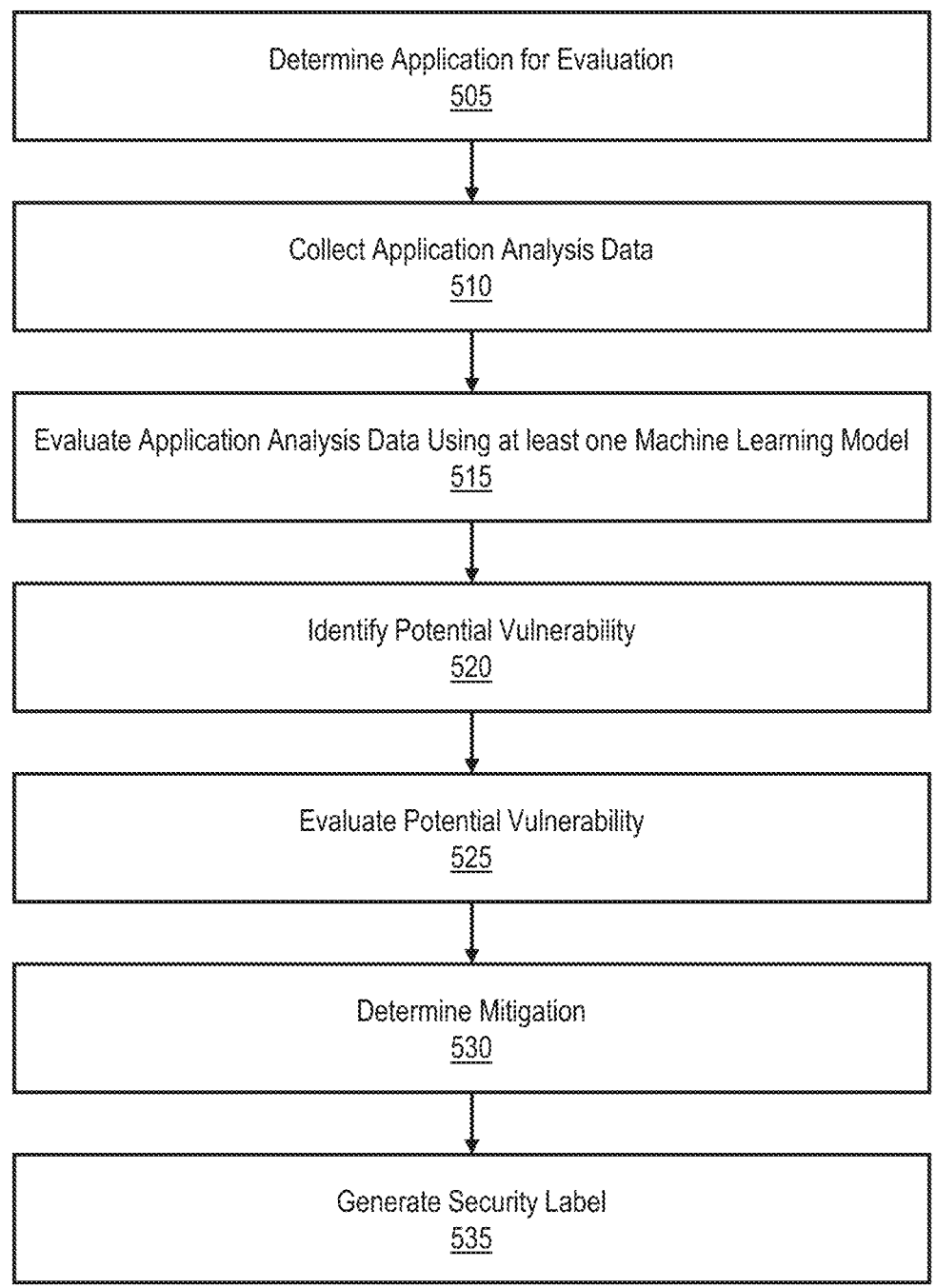
FIG. 5 is a flowchart that illustrates an example process for vulnerability discovery according to some implementations.

FIG. 5 is a flowchart that illustrates an example process for vulnerability discovery according to some implementations. At act 505, a system can determine an application of interest for evaluation. For example, the system can receive a user indication of an application of interest to be evaluated. In some implementations, the application of interest can be identified automatically. For example, a system can be configured to detect a new application installation, an update, or a configuration change, which can trigger evaluation of the application. At act 510, the system can collect application analysis data, for example as described herein. The application analysis data can include, for example, dynamic analysis data, static analysis data, network analysis data, source code analysis data, and so forth. At act 515, the system can evaluate the application analysis data using a machine learning model or multiple machine learning models. For example, in some implementations, a single model accepts the application analysis data, a subset of the application analysis data, or a representation of all or a portion of the application analysis data (generally, a set of data) as an input (or a representation of the application data), and analyzes the set of data for potential indications of security vulnerabilities, such as hardcoded credentials, unsanitized inputs, unusual network access patterns, and so forth. In some implementations, multiple models are used. The different models can be used to evaluate different assessment domains and/or different types of application analysis data (e.g., static analysis data, dynamic analysis data, code analysis data, network analysis data). The model or models can generate an output or a set of outputs indicative of a potential vulnerability. At act 520, the system can, based at least in part on the results of the evaluation, identify a potential vulnerability. For example, the system can identify a potential vulnerability based on the detection of issues such as hardcoded credentials, network access patterns, and so forth, as described in more detail herein. In some implementations, the outputs indicate or are used to determine information about the potential vulnerability such as the type of vulnerability, attack vector, required privileges for exploiting the vulnerability, user interaction requirements for exploiting the vulnerability, and so forth. At operation 525, the system can evaluate the potential vulnerability, for example by attempting to exploit the potential vulnerability. In some implementations, the system executes existing, known exploits to attempt to exploit the potential vulnerability. In some implementations, a known exploit is identified based at least in part on the set of data and/or the outputs of the machine learning model. In some implementations, additionally or alternatively, the system generates one or more exploits to attempt to exploit the potential vulnerability, for example as described in more detail herein with respect to FIGS. 12 and 13. At operation 530, the system can determine a mitigation for the vulnerability, for example as describe herein with respect to FIG. 13. In some implementations, a mitigation can be based on information provided in an external data source, such as a knowledge base article provided by a software vendor, a posting made by a security provider, or mitigations published by a service such as MITRE ATT&CK. At operation 535, the system can generate a security label. The security label can indicate, for example, a risk level before and after mitigating the identified vulnerability. In some implementations, operations 530 and/or 535 may not be performed if the evaluation at operation 525 is unable to determine that the potential vulnerability can be exploited. An example security label is shown and described in more detail below with respect to FIG. 8.

Figure 6:
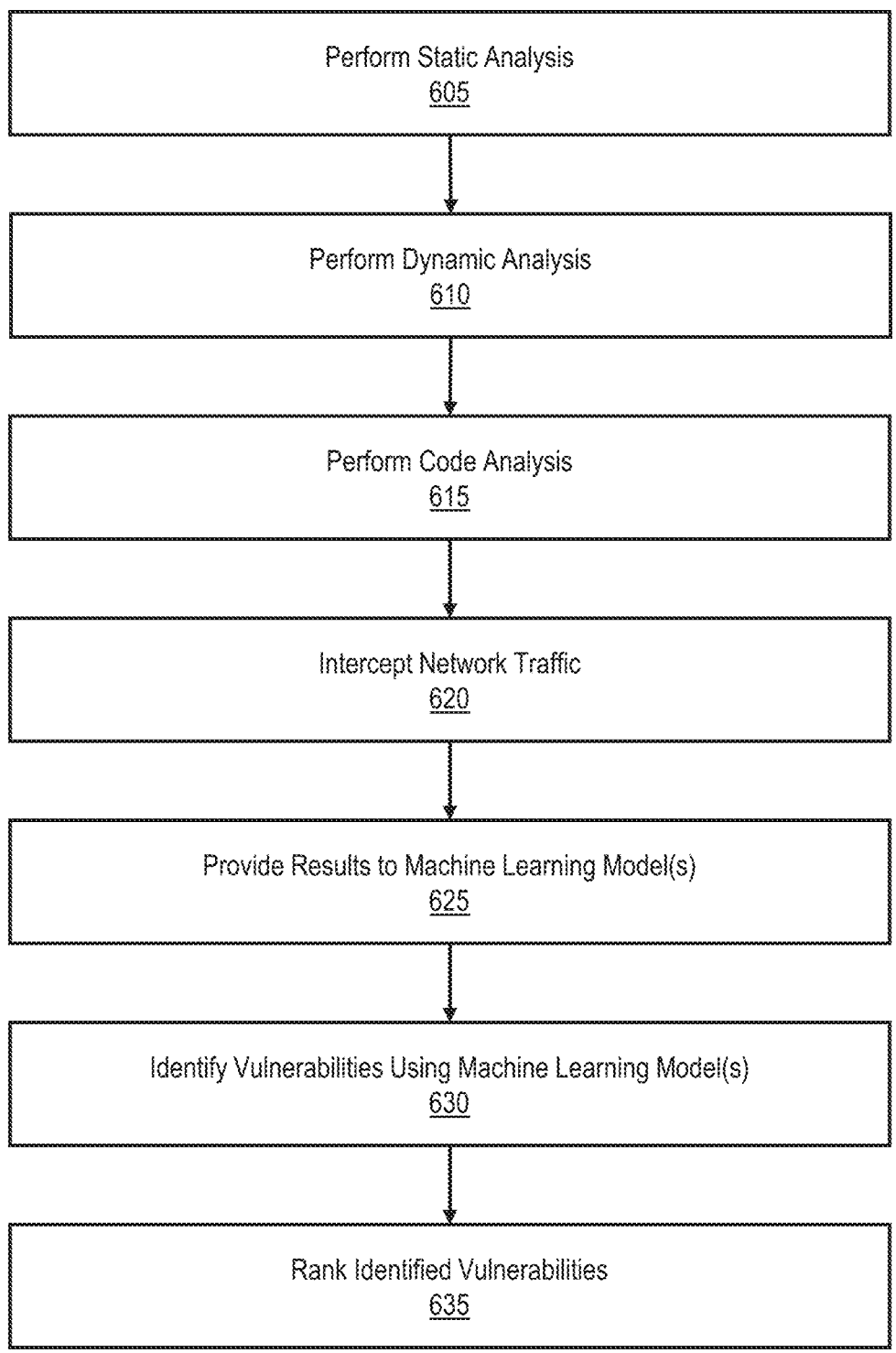
FIG. 6 is a flowchart that illustrates an example vulnerability discovery process according to some implementations.

FIG. 6 is a flowchart that illustrates an example vulnerability discovery process according to some implementations. FIG. 6 is described with respect to an application. However, it will be appreciated that the process shown in FIG. 6 can be applied to multiple applications or to an entire platform. At act 605, a system can perform static analysis of the application, for example by analyzing the application (e.g., a binary application) to determine possible execution paths, control flows, data flows, etc. Static analysis can include disassembling an application using a disassembler application. The disassembler can identify, among other things, execution paths of the application. In some implementations, other applications can be used additionally or alternatively for static analysis. For example, the "strings" application included in Unix and Unix-like operating systems can be used to find and extract strings of printable characters in files, including text files and binary files. At act 610, the system can perform dynamic analysis by running the application and observing its behavior. In some implementations, the dynamic analysis can include running the application multiple times with different inputs. In some implementations, fuzzing is used to generate inputs. At act 615, the system can perform code analysis, for example using a linter. At act 620, the system can intercept network traffic associated with the application. At act 625, the system can provide the information derived from acts 605 through 620 to one or more machine learning models. At act 630, the one or more machine learning models can identify one or more vulnerabilities in the application. At act 635, the system can rank the one or more identified vulnerabilities.

The specific analysis that is performed and data that is collected can vary from application to application. For example, if an application does not communicate over a network, there may be no network traffic to intercept or analyze. If an application is closed source, the source code may not be available for code analysis. If the application is a script rather than a compiled executable or bytecode, static analysis may not be performed, as there is no binary to disassemble and the information that would be collected from static analysis can be readily determined from analyzing the source code.

Figure 7:
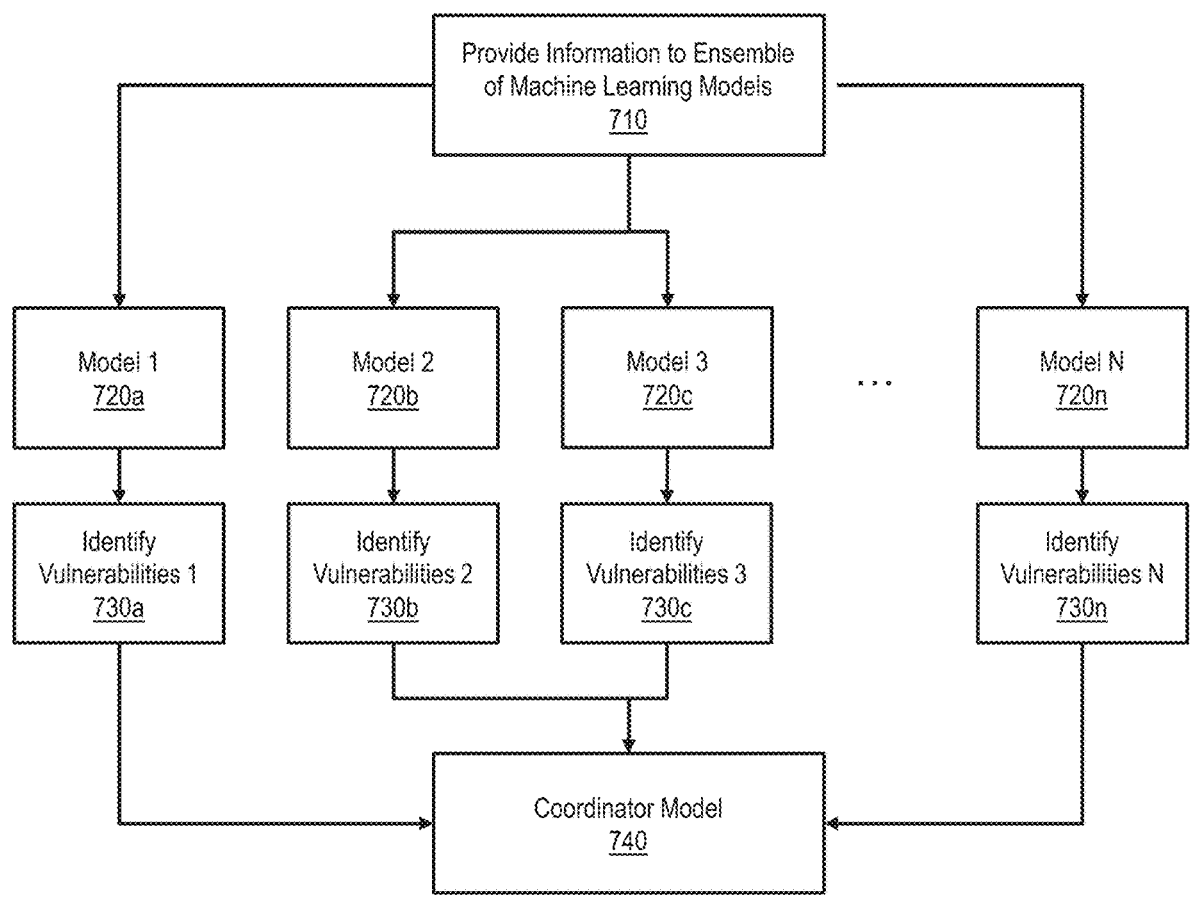
FIG. 7 illustrates an example of using an ensemble of machine learning models to identify vulnerabilities.

As described herein, in some implementations, a single model is used for vulnerability discovery. In some implementations, an ensemble of models is used to identify vulnerabilities. FIG. 7 illustrates an example of using an ensemble of machine learning models to identify vulnerabilities. At act 710, a system can provide information (e.g., static analysis data, dynamic analysis data, code analysis data, network monitoring data, TTP data, platform data, etc.) to an ensemble of machine learning models 720a-720n. At acts 730a-730n, each of the machine learning models 720a-720n can identify vulnerabilities in an application, platform, etc. In some implementations, each model 720a-720n is configured to identify vulnerabilities in a particular assessment domain. In some implementations, each model 720a-720n is configured to identify vulnerabilities based on particular data. For example, model 720a can be configured to identify vulnerabilities using static analysis data, while model 720b can be configured to identify vulnerabilities using dynamic analysis data. In some implementations, a model can be configured to use multiple types of data, such as TTP data and dynamic analysis data in combination.

FIG. 8 shows an example zero day security label according to some implementations. In FIG. 8, assessed risk and mitigated risk are shown for a variety of assessment domains. In the example security label of FIG. 8, a high risk remote attestation-related zero day vulnerability can be mitigated to a medium risk vulnerability. In FIG. 8, different assessment domains are illustrated, but it will be appreciated that other breakdowns are possible. For example, in some implementations, the security label can show risks by tactic (e.g., access, persistence, privilege escalation, credential access, lateral movement). In some implementations, the security label is configured to show risks before and after a change. For example, the security label can show risks before and after an update is installed.

Vulnerability Landscape Evaluation

As described herein, attack surfaces are not constant and can change based on a wide variety of factors, such as changes to a platform architecture, software updates, configuration changes, and so forth. For example, when new software or new versions of software are installed, software is removed, libraries are introduced or deprecated, network architecture is changed, functionality is moved between infrastructure types (e.g., on-premises, public cloud, private cloud), an authentication method is changed or added, an application programming interface (API) is changed or added, an integration with a third party service is changed or added, a new vendor (e.g., a new cloud provider) is added, and so forth, there can be significant changes in the attack surface.

As an example, organizations have in recent years migrated primarily from on-premises or private cloud solutions to public cloud (which can include virtual private clouds) or hybrid cloud solutions. In a hybrid cloud approach, various types of systems and services are used in combination. These combinations can include on-premises services, private cloud services, public cloud services, or any combination thereof. In some cases, an organization may utilize multiple cloud services, for example by operating certain functionality or services on one platform and other functionality or services on another platform. In some cases, different platforms are used for availability or redundancy purposes, for example by running the same service on two different public cloud services for improved resiliency against problems such as outages or performance issues with one public cloud service.

While such approaches can offer improved reliability, flexibility, performance, scalability, and so forth, hybrid approaches present significant risks. For example, data can be exposed during transfer to and/or from a public cloud service, or even within a cloud environment. It can be challenging to manage security policies across environments, as configuration options may be different for different environments, and in some cases, it may be impossible to implement the same security policies, for example because configuration options and/or features in one platform may not exist in another. Added complexity can provide a significantly increased risk of misconfiguration. Hybrid approaches can amplify this risk as multiple systems or services need to be configured and maintained, communication between platforms needs to be carefully secured, and so forth.

When multiple services are used together, the attack surface can increase substantially. For example, each component of a hybrid cloud has its own set of access points, such as APIs, user interfaces (e.g., configuration interfaces), network connections, and so forth. A greater number of access points can mean more opportunities for attackers to find and exploit vulnerabilities.

Integrating different environments can be complex, leading to potential misconfigurations and security gaps. In some cases, engineers may use relaxed security controls during testing or development in order to avoid being held up by such integration issues. These relaxed controls can still be present in a production environment if adequate measures are not taken to ensure that platforms are properly secured before being deployed to production.

Depending upon the particular implementation, data may frequently be transferred between environments (e.g., from a private cloud to a public cloud). This can present a significant risk as data in transit can be intercepted if not properly secured (e.g., encrypted).

As described herein, infrastructure changes (e.g., migrating services to different platforms) are only one reason an attack surface may change. Attack surface changes can arise for many other reasons, such as software updates or API changes. Moreover, the approaches herein are not limited to security applications. For example, a software update or other change can cause a negative performance impact, introduce stability issues, and so forth. As an example, a flaw in a configuration file can cause a process to crash. In some cases, an entire system can crash or become unstable, for example if the configuration file affects a process that operates in kernel mode.

In some implementations, the approaches herein are used to identify changes to an attack surface. By identifying changes in an attack surface, potential vulnerabilities and/or exploits can be uncovered, mitigation actions can be determined, and so forth. As described herein, while monitoring and responding to changes in attack surfaces is important for maintaining security, doing so can be a time-consuming and error-prone task. Advantageously, the approaches herein can utilize machine learning techniques to enable faster, more thorough, and/or more accurate analysis, thereby improving the security of computer systems and applications.

In some implementations, a single model is used for evaluating attack surface changes. in some implementations, multiple models are used. Multiple models can be advantageous for many reasons. For example, different models may be better suited to processing different types of information, conducting different types of analysis, and so forth. Additionally, models typically have limited attention and other limitations, which can result in poor performance when handling complex problems with many relevant model inputs, many external sources of information, and so forth.

In some implementations, retrieval augmented generation is used to aid in attack surface analysis, for example in the case that general purpose LLMs are used, although RAG can be useful for providing up-to-date contextual information even for specially trained LLMs. RAG is a technique that can enhance the capabilities of LLMs. Traditional LLMs are trained on large datasets that include a wide variety of subject matter. RAG can leverage external knowledge bases. When responding to a prompt or question, an LLM can retrieve relevant information from an external source (or another component can retrieve relevant information), such as published security information, TTP information (e.g., TTP information provided by the MITRE™ ATT&CK™ platform), and so forth. The retrieved data can be incorporated into the internal processing of the LLM, enabling the LLM to produce results that are more contextually relevant, reflective of the current security landscape, and so forth. As another example, Common Vulnerabilities and Exposures (CVE) data can be retrieved and used by a model when identifying vulnerabilities in an application, system, or platform.

For example, a system can receive an input query. The system can search an external knowledge base for documents or other information that is most relevant to the query. In some embodiments, the query and knowledge base content can be embedded into a common vector space, thereby enabling efficient retrieval based on semantic similarity. Once relevant documents or information are identified, RAG can use a ranking algorithm to determine the most informative or trustworthy sources. The ranking process can be influenced by, for example, document relevance, source credibility, publication date, etc. A subset of relevant documents can then be used for further processing. For example, the top document, top five documents, top ten documents, etc., can be used for further processing. Retrieved documents can be used to augment the original query. For example, key facts, summaries of relevant articles or blog posts, etc., can be incorporated into the query to generate an enriched query. The enriched query can provide the LLM with context that can be useful in generating a response.

In some implementations, the approaches herein include generating a security label, which can enable easier understanding of the impacts of changes in the attack surface. The security label can compare a current state with a proposed state of an application, system, platform, etc. In some implementations additional comparisons can be included in the security label. For example, in the case of an organization considering adding a cloud service provider, the security label can include current security levels, security levels of the cloud service provider, and security levels for a planned combined configuration that utilizes the current platform and the cloud service provider. While cloud providers are one example, such a security label can be used for any third party vendor that provides software and/or hardware services.

FIG. 9 is a drawing that illustrates an example security label for existing and proposed platforms according to some implementations. The security label 900 can provide an overview or summary of the security levels of an existing platform, a proposed platform in isolation, and the combination of the existing and proposed platforms together. The security levels for the combined platform can indicate security levels if the existing platform and the proposed platform were integrated to work together, for example if certain functionality were migrated from an existing platform to a proposed platform, while other functionality remained on the existing platform. The security levels for the combined platform can take into account planned interoperability, data sharing, and so forth between the existing platform and the proposed platform. For example, in some implementations, an LLM receives a document, plan, or the like that describes the combined platform.

In FIG. 9, the security label 900 includes assessments across various assessment domains 905$a$-905$e$. In FIG. 9, the assessment domains include input validation, third party service integrations, API access, cryptography, data sharing, and authentication. These are merely examples, and it will be appreciated that other assessment domains can be included additionally or alternatively. The security label 900 includes assessed risk (AR) and mitigated risk (MR) for each assessment domain. The assessed risk can represent a baseline risk without taking particular mitigation actions. The mitigated risk can present a risk after one or more mitigations are put in place. The risks can be assigned a numerical severity, categorical severity (e.g., low, medium, high), etc.

As shown in FIG. 9, the assessed risks, mitigated risks, or both can vary across scenarios. For example, in FIG. 9, the third party service integrations risk is low for the current platform. This can be because, for example, the current platform does not allow for third party service integrations or heavily restricts third party service integrations. A proposed platform can have a high third party service integration risk, for example, because the proposed platform readily enables integration with third party services. In the combined platform, the assessed risk can be high (e.g., driven by the high risk of the proposed platform), while the mitigated risk can be medium as shown in FIG. 8 (or even low in some scenarios). This can be because, for example, the third party services integration risk can be effectively mitigated by restricting access to third party services in the proposed platform or especially sensitive data can be kept on the current platform rather than the proposed platform, thereby limiting the risk posed by third party services. As another example, cryptography risk can be higher in a combined platform. This can be because sharing data between the current platform and the proposed platform can involve transport of unencrypted data, sharing of encryption keys between the current and proposed platform, etc.

Assessing risk for the combined platform can present several challenges. For example, risk can differ significantly depending upon the proposed configuration for the combined platform (e.g., how the current and proposed platform will communicate, which functionality will be moved to the proposed platform, what data will be communicated between the current platform and the proposed platform). In some implementations, a user can provide a proposed configuration for the combined platform. The proposed configuration can be in the form of network diagrams, flowcharts, written descriptions, etc. In some implementations, a machine learning model (e.g., an LLM) can be utilized to process proposed configuration information in order to evaluate risks associated with the combined platform. In some implementations, a user can provide a natural language description of the proposed configuration change (e.g., "We are considering migrating from on-premises Active Directory® to Entra ID"). Such information can be used to determine which services or functionality will operate on the current platform and the proposed platform, to determine how the current platform and proposed platform will interact, and so forth. In some implementations, the description can be used to infer the proposed platform. For example, the LLM can determine that Entra ID implies that the cloud service being considered is Azure®. In some implementations, a user may supply detailed information about a proposed configuration. In other cases, however, users may only provide general guidance. Advantageously, the approaches described herein can process general guidance or detailed proposed configuration information to determine a configuration for evaluating the combined platform.

Figure 10:
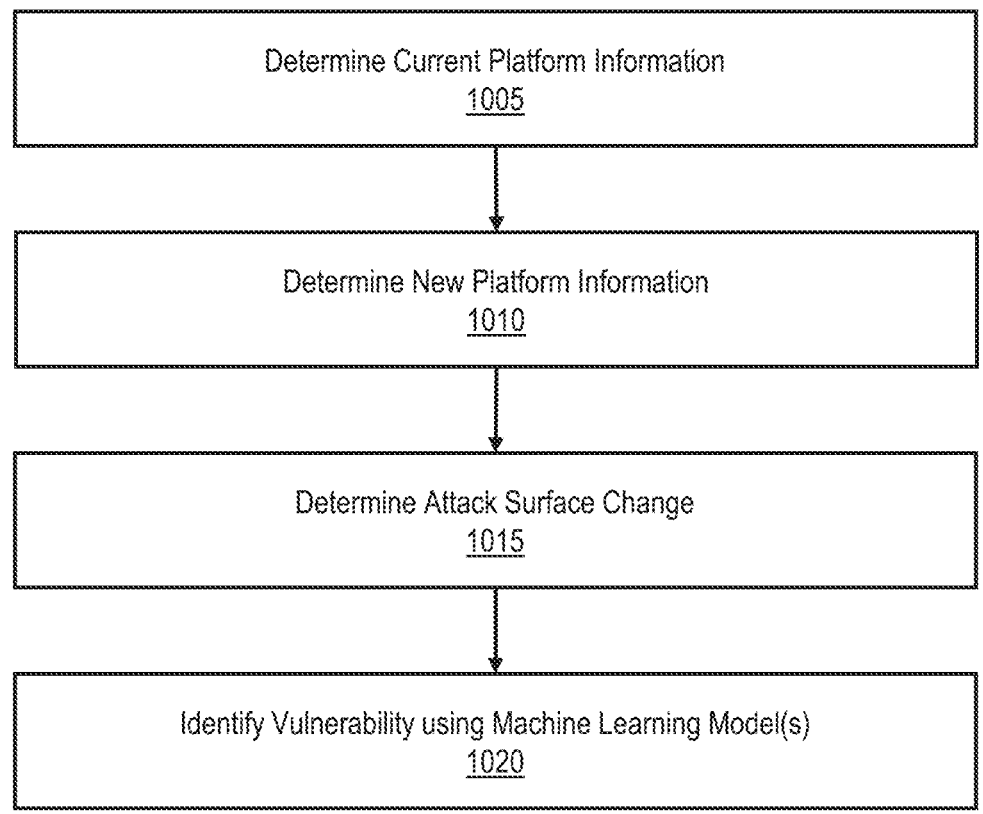
FIG. 10 is a flowchart that illustrates an example process for discovering vulnerabilities arising from platform changes according to some implementations.

FIG. 10 is a flowchart that illustrates an example process for discovering attack surface changes arising from platform changes according to some implementations. The platform changes can include, for example, application migration, adding or removing a vendor (e.g., a cloud services provider), and so forth. At act 1005, a system can determine current platform information. The current platform information can indicate a present state of a platform, although in some cases the current state may be a previous state, for example in the case that changes have already been implemented. At operation 1010, the system can determine new platform information. The new platform information can indicate a state of the platform after one or more changes are made, such as changing a network configuration, installing a software update, adding a cloud service provider, etc. This can generally be referred to as a new state, though the changes may or may not have already been implemented. At act 1015, the system can determine a change in the attack surface between the current platform (e.g., a first state) and the new platform (e.g., a second state, the second state occurring or planned to occur later in time than the first state). In some implementations, the system can use a machine learning model or an ensemble of machine learning models to determine the change between the second state and the first state, for example based on platform information describing the first state and platform information describing the second state or based on a natural language description of the change between the first state and the second state. At operation 1020, the system can use one or more machine learning models to identify a vulnerability arising due to the change in the attack surface between the current platform and the new platform, for example using the techniques described herein.

Figure 11:
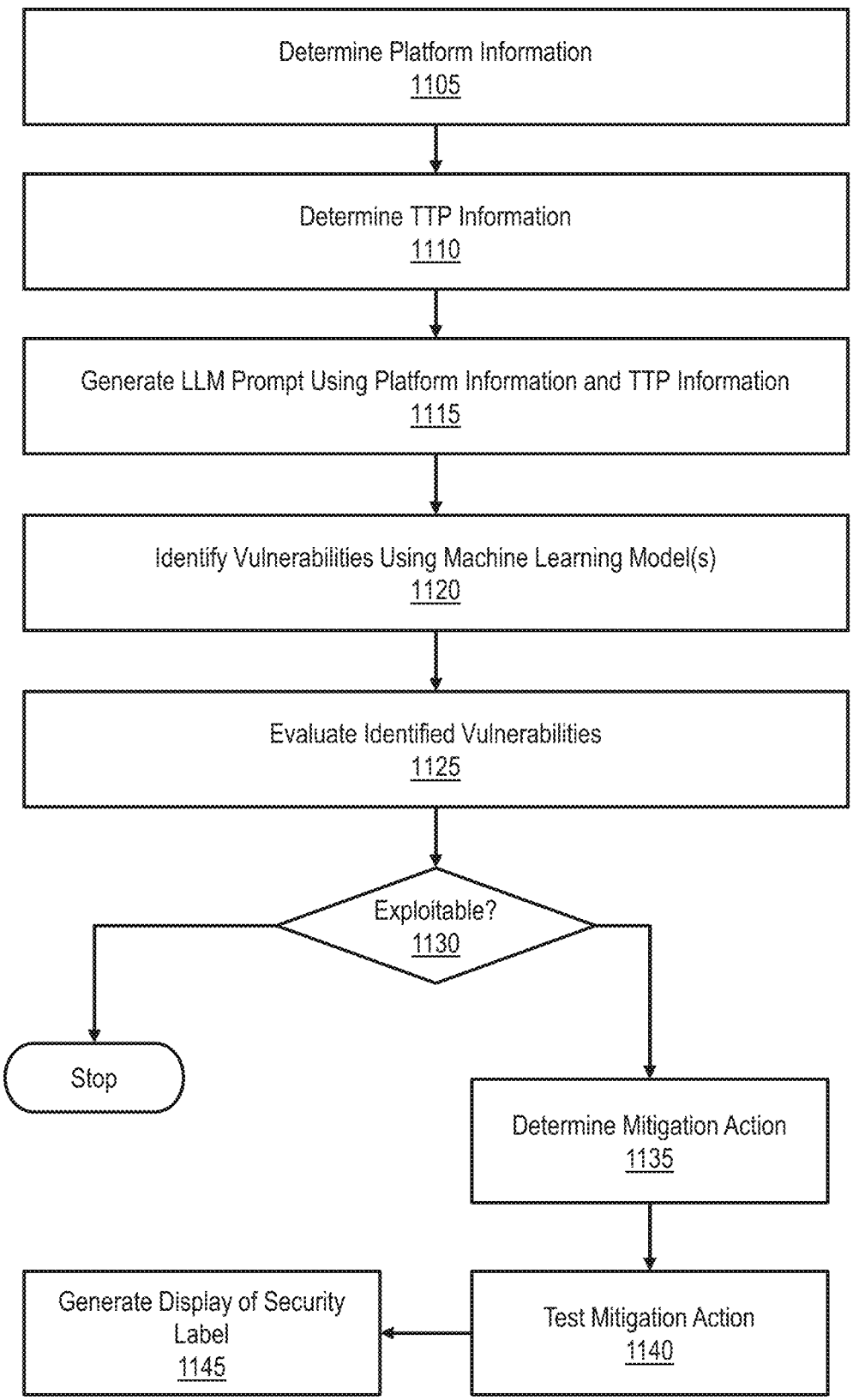
FIG. 11 is a flowchart that illustrates an example vulnerability discovery process according to some implementations.

FIG. 11 is a flowchart that illustrates an example vulnerability discovery process according to some implementations. At act 1105, a system can determine platform information, such as network architecture, installed software, running services, etc. In some implementations, the platform information can be information for a first state, a second state, or a difference between a first state and a second state. At act 1110, the system can determine tactics, techniques, and procedures (TTPs) information. TTP information can be indicative of malicious activity that could occur on a computing platform. In some implementations, the TTP information is accessed from a web site or other data source that publishes TTPs. For example, TTP information can be accessed using the MITRE™ ATT&CKT platform. The ATT&CK platform is a knowledge base that maintains information about tactics and techniques. The ATT&CK platform provides examples of specific procedures, examples of mitigations, detection examples, and so forth. In some implementations, the system can select a subset of TTP information that is relevant to the platform, for example based on the platform information. For example, TTPs related to mobile operating systems can be excluded when the platform does not include a mobile operating system. At operation 1115, the system can generate an input for a machine learning model (e.g., a prompt for an LLM). The system can use the platform information, the TTP information, both, or neither when generating the prompt. In some implementations, other information can be used additionally or alternatively. At act 1120, the system can identify a vulnerability using the machine learning model. At act 1125, the system can evaluate the identified vulnerability. For example, the system can generate one or more exploits (for example, as described herein) and can perform testing to determine the impact of the vulnerability. In some implementations, the system additionally or alternatively accesses existing exploits and use them to assess the vulnerability. At act 1130, the system can determine if the vulnerability is exploitable, for example based on results of the evaluation at act 1125. If the vulnerability is not exploitable, the process can stop. If the vulnerability is exploitable (e.g., the vulnerability can be exploited to cause aberrant behavior of the platform), the system can, at act 1135, determine a mitigation action. The mitigation action can include, for example, patching, configuration changes, and so forth. In some cases, the system may not be able to determine a mitigation action. At act 1140, the system can test the mitigation action (if a mitigation action was determined at act 1135). For example, the system can apply the mitigation and perform additionally vulnerability testing to determine if the vulnerability is still present after applying the mitigation action. At act 1145, the system can generate a security label, which can indicate assessed risk, mitigated risk, or both across one or more assessment domains.

While described with reference to TTP information, the process shown in FIG. 11 can additionally or alternatively utilize CVE data or similar data, which can identify specific vulnerabilities. For example, a system can be configured to determine a change between a second platform state and a first platform state and, based on the determined change, identify one or more CVEs that affect the second (e.g., later) platform state but not the first (e.g., earlier) platform state.

Attack and Mitigation Synthesis

The approaches described herein can be used to synthesize an attack using one or more known vulnerabilities by analyzing systems and/or infrastructure to determine where there may be exposure to a vulnerability. The disclosed techniques can be used to generate patches or other mitigations. The disclosed techniques can be used to determine paths through which an exposure can be exploited and can also be used to analyze security controls in an exploit path. The disclosed techniques can provide automatic testing prior to patching, automatic testing after patching, validation after patching production systems, etc. the techniques can also be used to create patches, deployment scripts, etc. These various functions are described in more detail herein.

In some implementations, an LLM can be used to generate an exploit based on one known vulnerability or more than one known vulnerability. Vulnerabilities information and/or other security information can be pulled from various third-party sources. In some implementations, the LLM ingests CVE data and/or other data, and the LLM can use this information to generate an exploit for the vulnerability. The generated exploit can be deployed to evaluate the effects of the vulnerability, assess which systems are impacted by the vulnerability, and so forth. In some implementations, a system uses retrieval augmented generation (RAG) with an LLM to enhance to quality and/or relevancy of the outputs of the LLM. For example, RAG can be used to provide the LLM with information about APIs, libraries, system configurations, previous successful exploits, and so forth (generally referred to as "supporting information" herein).

RAG can involve a two-step process. In a retrieval step, a system can retrieve relevant supporting information from a larger source of data. The retrieval can be carried out using a retrieval model. The retrieval model can utilize dense vector representations to identify portions of data that are relevant to a particular query. In a generation step, the retrieved information can be used as an input or context for an LLM. The LLM can use the retrieved information along with the initial input context to generate an output, which can be, for example, an exploit, patch, etc. A system can be configured to use retrieved information as part of the input or can be used in a multi-prompt configuration to guide the generation process. The use of RAG can enable an LLM to provide outputs that are more accurate, more relevant to a given context, etc.

Various refinement techniques can be used to improve the use of RAG and/or the performance of an LLM. Various prompt engineering approaches can be used additionally or alternatively. Refinement techniques can include, for example, multiple chunking approaches, metadata-based ranking, PEFT LoRA, etc. In some implementations, the approaches herein utilize prompt engineering techniques such as chain of thought, personae, and/or multi-prompting to improve performance and/or to generate longer, more complex, more nuanced, and/or more specific outputs. For example, personae can be used to cause the LLM to respond in a particular manner, such as providing responses consistent with what an attacker would do. Chain of thought can be used to break down a complex problem into smaller pieces, generating intermediate outputs that can be refined as needed. Multi-prompting can be used to explore different dimensions of a problem. For example, in the context of generating an exploit, multi-prompting can be used to determine various aspects of the exploit, such as how to access a system, code or inputs to supply to a system to exploit a vulnerability, etc.

As described herein, the disclosed techniques can be used to synthesize code to exploit a known issue. Some LLMs are suitable for generating code in one or more programming languages. For example, the techniques herein can be used to generate code in Java, C, C++, C#, Swift, Python, Ruby, JavaScript, TypeScript, shell scripting languages (e.g., for bash, tcsh, csh, zsh, PowerShell, etc.), or any other language.

In some implementations, a generated exploit may not include executable code. For example, in some implementations, the techniques described herein can be used to generate instructions that guide a user in exploiting a vulnerability. In some implementations, the techniques herein can generate pseudocode that a human can use to create an exploit. Such functionality can be advantageous when, for example, the LLM has not been sufficiently trained on a particular programming language or particular library or libraries to generate executable code for carrying out an exploit. For example, an LLM may struggle to generate code in less common languages such as Haskell or Lua. In some implementations, a generated exploit can comprise a vector or set of vectors, which can, in some implementations, be used by another model to further develop an exploit.

While LLMs can be well-suited to generating code, there can be limitations with currently available models. For example, current LLM technology is typically limited to generating small snippets of code to perform specific functions or discrete tasks. Thus, to use LLMs to generate vulnerability exploits, which can be complex, it can be important to recognize and address this limitation.

In some implementations, the techniques herein can provide an application or API that accesses a CVE or other source data, and an LLM can use the provided source data and retrieval augmented generation to determine the parts (e.g., features) of the source data (e.g., parts of a CVE) that are relevant to exploiting the vulnerability (e.g., affected software, affected version, affected file, type of vulnerability (e.g., buffer overflow, SQL injection, privilege escalation, etc.), attack vector (e.g., network, adjacent network, local, physical), required privileges, whether or not user interaction is required, etc.). In some implementations, information can be split based on whether it is aligned to the creation of an attack, including for example the language to use, the nature of the exposure, an expected fix, etc.

In some implementations, to generate an exploit, a system can create a set of components, which can include, for example, a single exploit function or a combination of functions. The exploit function(s) can have one or more required data elements in some implementations. The system can generate or utilize an existing attack harness to execute the exploit function. In some implementations, executing the exploit function can include executing the exploit function multiple times using different values for one or more data elements. In some implementations, the system can generate or utilize a data set corresponding to the attack. The data set can, in some implementations, be generated by leveraging variational autoencoders (VAEs) to modify parameters. Variational autoencoders are a type of generative model that can be used to generate new data samples by capturing the underlying distribution of training data. In a VAE, an encoder network can map input data to a latent space. The encoder network can learn to encode input data in a mean and variance vector. A decoder network can take a sample from the latent space and reconstruct the original input data. The decoder network can learn to generate outputs that are similar to the training data. The use of VAEs can help to generate data that can be used as data elements for an exploit function. Advantageously, this generated data can be similar to training data so that the generated data has a higher likelihood of being a useful input to the attack function, as opposed to, for example, being irrelevant or inapplicable data.

In some implementations, exploit function data elements can include, for example, usernames, passwords, IP addresses, domain names, strings (e.g., strings of varying lengths for testing buffer overflow vulnerabilities), or any other data that can be used in exploiting a vulnerability. In some implementations, data element values can be based on known information such as the usernames of users or administrators, IP addresses of servers, names of servers, Active Directory domain names, etc.

An LLM can be trained to generate exploits, for example by training the LLM using previous exploits, though this is not necessary and, in some cases, an LLM may not be specifically trained for security applications. In some implementations, the retrieval augmented generation can be used to provide the LLM with information that can be used in generating exploits, such as examples of previous exploits, exploit functions, snippets of exploit functions, etc. Code for previous exploits can be valuable when generating new exploits, as exploits can tend to be similar to previous exploits or can share common features with previous exploits.

As described herein, current AI technology may not be sufficient to create an attack without breaking the task down into smaller pieces. LLMs typically have a maximum token limit, which can restrict the length of generated output. The token limit can vary depending upon the specific LLM, available resources, configuration settings, etc. To generate a larger amount of code, it can be beneficial to split a code generation task into smaller segments or chunks. In some implementations, the outputs of each segment of the code generation task can be combined to generate a final output. In some implementations, prompt engineering can be used to guide an LLM when generating code. For example, by providing specific instructions or context in a prompt, the LLM can be caused to generate code that aligns with various requirements. It will be appreciated that the need to break down code generation tasks can wane over time as models improve and/or as computer hardware improves and can more easily handle the generation of large outputs, and so forth. Moreover, while exploits are often complex, this is not necessarily the case. Thus, in some cases, a system may utilize an LLM to synthesize an exploit without breaking the code generation into multiple pieces.

To generate code, a system can be configured to utilize a set of pre-made code snippets to construct a larger set of code to implement an attack. For example, if an attack is API-based, a system can utilize a stubbed API as part of the prompt. In some implementations, the prompt can include a field name, attack target, access information, etc., as data elements.

An organization, individual, etc., can use the techniques described herein to conduct vulnerability testing on their own systems. However, as described herein, there can be many systems involved, including systems not controlled by the organization or individual. For example, during an interaction between a company and a customer, there can be company systems, cloud provider systems (over which the company may have some level of control), customer systems (e.g., a smartphone, desktop, laptop, tablet, etc.), networking hardware (e.g., Wi-Fi routers, ethernet routers, switches, load balancers, cellular communications hardware, etc.) involved. Thus, it can be significant to generate exploits that can test a wide range of systems. However, when testing systems that are outside the organization's direct control, it can be important to ensure that synthesized attacks do not have negative effects on such systems.

As an example of testing from the perspective of an end user device, the approaches herein can be used to test exploits for vulnerabilities that affect, for example, outdated applications, outdated system software, insecure network connections, and so forth. From a company perspective, the approaches herein can be used for vulnerability testing of, for example, server software (e.g., unpatched or otherwise outdated server software), misconfigurations, etc.

The results of vulnerability testing can be used to identify one or more mitigation actions (e.g., fixing, avoidance, or deflecting) that can be taken. Mitigation actions can include, for example, applying a software patch, changing a software configuration, rerouting network traffic to avoid affected systems, or implementing deflection capabilities, such as identifying nefarious network traffic and routing it to non-production systems. As one example, if there is a vulnerability affecting systems from a first cloud services provider, actions can be redirected to a second cloud services provider that is not affected by the vulnerability.

In some implementations, vulnerability testing is used to rank vulnerabilities. As described herein, there are a large number of vulnerabilities, and testing and patching them can consume significant resources. Thus, there can be a need to prioritize response actions. In some implementations, vulnerability ranking is determined automatically, for example based upon an identification of which systems are vulnerable, the possible fallout from exploitation (e.g., a system being taken offline may be less impactful than customer data being stolen), etc. Ranking can be carried out at a vulnerability level, a system level (e.g., prioritizing patching systems that contain or have access to sensitive information or that are critical to operations over systems that are less critical or that do not have access to sensitive information), or both. In some implementations, ranking includes the use of CVSS scores.

In some implementations, a system can build a test harness. A test harness can be a framework or set of tools or scripts that facilitates automated vulnerability testing. The test harness can include, for example, test cases, test scripts, and so forth. In some implementations, a test harness can include data retrieval, logging, and/or reporting functionality. In some implementations, the test harness includes analysis capabilities. As with generating a vulnerability, the test harness can, in some cases, be constructed in pieces using an LLM, for example with a loop and single exploit executor built separately from a data importer and, optionally, error handling logic. The particular features included in a test harness can vary from implementation to implementation. In some implementations, a system or user specifies as part of an LLM prompt what functionality to include in the test harness.

In some implementations, deployment targets can be built on open source and/or public cloud infrastructure. In some implementations, deployment targets can be built for on-premises execution. Generated attacks can be configured to target different operating systems, servers, etc.

In some implementations, a library of components is built and provided to RAG data sources. Components can be vectorized and applied based on best fit logic. In some implementations, the best fit logic is refined during training, for example using Parameter-Efficient Fine-Tuning Low-rank Adaption (PEFT LoRA) techniques to improve matching. Over time, the library can grow to support multiple attack approaches, operating systems, languages (which can include bytecode), recovery techniques, deployment targets (which can include techniques such as JiBX), and attack targets.

A data set containing data passed to an exploit function can be self-describing, for example with column headers aligned to field names used in the attack function code. In some implementations, initial data sets are prepared by, for example, extracting information from CVE data, from knowledge data describing systems or networks, from other data sources, and/or by hand. In some implementations, a data set can be extended using VAEs. As described herein, a VAE can be useful in such scenarios because VAEs can be used to generate data that is similar to data used to train the VAE. In some implementations, validity of the data set can be checked using a generative adversarial network (GAN). For example, a GAN can be used to compare generated data to real data to determine similarity between the generated data and the real data. VAEs generally are trained such that they generate data that follows a distribution in a learned latent space. There may be greater variation in data generated using a VAE than data generated using a GAN, since GANs are typically trained to generate outputs that closely resemble training data. VAE-generated data can be useful for exploring a latent vector space, while GANs can be useful for ensuring that the data generated by a VAE is realistic (e.g., that the VAE-generated data closely resembles training data).

A results output can depend on how and/or where an exploit function is run. For example, a generated exploit or harness may write to standard output (stdout) and/or to a filesystem for persistent storage. In some implementations, an output subsystem is configured to handle output of the generated attack, for example to handle tasks such as writing to disk, writing to a database, etc.

A generated exploit can be run against all systems. However, such an approach can be inefficient as only a small number of systems may even potentially be susceptible to a particular vulnerability. For example, there may be no reason or benefit to test an exploit against a web server application on a system that doesn't run any web server software. Thus, it can be significant to determine where exposures may exist.

In some implementations, various information about systems can be used to determine where exposures may exist. For example, system information can include information about operating systems (e.g., operating system version, kernel version, etc.), installed patches, patch versions, third party libraries, library versions, installed software, software versions, etc. In some implementations, system configuration information can be used as a data source for a RAG subsystem.

Using system information in combination with CVE information can enable identification of potentially vulnerable systems. However, it can be difficult to know which systems are potentially vulnerable even when some system information is available. For example, in many cases, modern software—including web applications—is built on a plethora of third party libraries or frameworks, which themselves may depend on other third party libraries or frameworks, which may have their own dependencies. Determining a complete, accurate listing of software, libraries, frameworks, etc., that are in use on a system can be a difficult task as it may not always be clear what code is being used. This can be especially true in cases where code is not stored locally but is instead pulled from an external repository. Thus, in some implementations, vulnerability testing is conducted on systems even when it is not apparent that those systems are potentially vulnerable or have affected software installed.

It will be appreciated that even if a system does have vulnerable software installed or is running hardware with a vulnerability, this does not necessarily mean that the system is actually exploitable. For example, as described herein, CVE information may fail to identify specific version dependencies, configuration dependencies, etc. Moreover, even an unpatched system may not actually be exploitable. For example, if a system does not have unnecessary services enabled, has implemented strict access controls, etc., it may be harder to exploit a vulnerability on an unpatched system. Similarly, the presence of firewalls, endpoint detection and response (EDR) or extended detection and response (XDR) software, and so forth can prevent exploitation and/or reduce the potential damage caused if a system is exploited. For example, EDR and XDR software can, in some cases, be configured to automatically take actions when malicious activity is detected. Such mitigation actions can include, for example, disabling network access, stopping services, etc. In some implementations, patches can be generated that configure EDR or XDR software to detect and/or take mitigation actions when an attempt to exploit a vulnerability occurs.

In some implementations, once a system is identified as exposed or potentially susceptible to a vulnerability, it can be significant to identify potential exploitation paths that can be used to exploit the exposure. In some implementations, a RAG subsystem can be used in determining attack paths that can be taken. Paths can be influenced based on, for example, network configuration, how an exploit is connected to other software, where an attack originates from (e.g., within an organization's network or externally, such as over the internet), etc. For example, in a standalone system with no connections to other systems, an attack can be sourced only from software or hardware locations in the systems, such as a vulnerable library, and may only be executed by individuals with local access to the system. In today's highly interconnected world, systems are frequently connected to a network, which can present a path for exploitation of an exposure.

In some implementations, a path comprises an ordered set of steps taken to gain access to a vulnerable system. For example, a path could include steps such as "access login page location at https:// . . . ; enter credentials; access stored payments page; click update payment information, . . . " This is merely an example, and it will be appreciated that there can be various paths which may involve accessing web pages, manipulating URLs, connecting to servers or other systems via protocols such as telnet, ssh, ftp, or sftp, and so forth. Some paths can involve connecting over specific networks, such as Wi-Fi networks that utilize specific networking hardware, cellular networks in specific locations or operated by specific providers, etc.

Once attack paths are established, the techniques herein can analyze security controls that are in place. For example, a security controls RAG source can be used as part of a multi-prompt workflow. Security controls can include, for example and without limitation, firewalls, intrusion detection systems, network access controls, endpoint protection software, network monitoring software, access control lists, file permissions, database permissions, remote connection permissions, etc. This information can be used to determine if an attack can be exploited or if controls in place are insufficient to prevent a particular type of attack. Regardless, in some implementations, the techniques herein can be used to attempt an attack. In some implementations, attacks can be attempted in a low-risk manner, for example in a manner that does not risk compromising normal operation of production systems. For example, attacks may be attempted in a test or development environment, rather than in a production environment, although in some cases, such testing may not be possible. For example, when conducting testing that employs user devices, networking infrastructure outside an organization's control, etc., it may not be possible to configure a test environment that is suitable for evaluating attacks.

Once attack paths are established, an application can deploy an exploit, which can include a single generated exploit or multiple generated exploits, an attack harness, data, and a results target. Depending upon where the software is executed, there may or may not be an ability to automatically deploy the software. For example, if an exploit is executed from a remote source, the attack can be deployed to a public cloud instance, such as Amazon Web Services, Microsoft Azure, or Google Cloud, among others. If an exposure can only be exploited from systems that are controlled by identity and access management (IAM) subsystems or continuous integration and continuous deployment (CICD) pipelines, the approaches herein can leverage humans or such pipelines to deploy attack software. Such limitations or requirements can be included in attack results. For example, it can be significant that an attack can only be deployed if one is able to bypass or compromise IAM or CICD.

When an exploit is executed on a target system, the results of running the exploit can be persisted or written to standard output, such as a system console. In some implementations, the results are written a database, text file, spreadsheet, etc. Various metrics can be used in gauging exploit success. These metrics can include, for example and without limitation, number of exploited paths, whether there are internal paths, external paths, or both, time taken to successfully exploit (e.g., was the attack easy to execute?), estimated time to patch a vulnerability, complexity of the exploit, ability to detect an exploit at low volumes or rates, ability to detect only at high volumes/rates, controls bypassed or loosened, severity of the exploit (e.g., PII data loss, other highly sensitive data loss, ability to conduct financial transactions or change critical system data, etc.). These metrics can be used in determining a risk level associated with a vulnerability.

Using attack results and RAG source data relating to an existing book of work, an application can establish a ranking relative to other security activities. Based on thresholds that can be defined and refined over time, subsequent actions can be taken. Subsequent actions can, based on the ranking, be automatically taken, queued for near-term execution, marked for review by security professionals, or logged as issues but considered closed. For example, actions may be automatically taken if a remediation measure is low risk, or an issue may be considered closed if a patch has already been applied or there is no viable path for exploiting a vulnerability.

In some implementations, ranking information is fed into the RAG subsystem and included as part of future LLM training. Special care can be taken to audit the results to prevent malicious results from being introduced into the data. For example, in some implementations, human review of exploit results, categorizations of the types of attacks, and/or exploit paths can be used to help highlight true areas of concern while giving lower priority or influence to results that are unrealistic. For example, even if an attack succeeds, it can be unrealistic if the attack took an excessive amount of time to carry out or was so complex that that is unlikely an attacker would be able to carry out the attack.

In some implementations, the techniques herein are used to create patches, deployment scripts, and/or monitoring. Creating these types of items can be analogous to creating a single attack pattern and/or an attack harness. A generated patch can be a software patch that directly addresses a vulnerability or can be a patch that avoids affected systems, deflects attacks, logs information, etc. That is, a patch as generated according to some implementations herein is not strictly limited to a software patch that directly addresses an identified vulnerability. For example, a patch for an SQL injection vulnerability can include, but does not necessarily include, code that closes the SQL injection vulnerability directly, but can include other mitigations, for example code that intercepts and sanitizes or drops incoming strings that are designed to carry out an SQL injection attack.

A patch does not necessary comprise code or configuration changes. For example, in some implementations, a system can generate instructions that can be carried out by a user to address a vulnerability.

As described above with respect to creating exploits, current artificial intelligence/machine learning technology is sometimes not sufficient to create patches and deployment scripts without breaking such tasks down into smaller pieces. In some implementations, code generation tasks utilize a set of code snippets that can be pieced together to create a patch, deployment script, etc. For example, if the patch is to be used to protect against API-based attacks, a stubbed service can be provided as part of a prompt. Relevant functions, fields, API calls, attack information, etc., can be provided as data elements. In some implementations, deployment scripts are built in pieces. Deployment scripts can utilize CICD pipelines where available. Deployment scripts can utilize secret stores for passwords, keys, certificates, etc. In some implementations, deployment targets are based on available exploit paths and/or which exploit paths were successfully exploited. In some implementations, RAG is used to provide examples of previous patches to the LLM, which can be used to aid in generating new patches.

In some cases, a single exposure may require multiple patches, for example to block multiple paths that malicious actors can take to exploit a vulnerability or to fully prevent or block an attempted attack. Typically, though not necessarily, the techniques herein can be used to generate a patch that is designed to stop a known exploit as early as possible. However, in some cases, a patch can be designed to allow an attacker to gain some level of access before being stopped, diverted to a decoy system, etc. A patch can be configured to stop an exploit early in an exploit path. In some cases, a patch is configured to, additionally or alternatively, stop an exploit just before a specific exposure. Allowing some level of access can offer certain benefits. For example, allowing an attack to proceed to some degree before stopping it can provide valuable information about the TTPs used by the attacker, the identity of the attacker, the location of the attacker, and so forth, which can be useful in stopping future attacks.

In some implementations, the techniques herein generate code for monitoring an exposure. Such monitoring may be particularly valuable in high risk situations, such as where there is potential for loss of PII or fraudulent transactions. In some implementations, monitoring code is built in a manner that is similar to or the same as exploit or patch code, for example leveraging artificial intelligence/machine learning models such as large language models to develop small components that are stitched together using multi-prompt approaches. In some implementations, the techniques herein provide multiple monitoring levels. Monitoring levels can include, for example, normal, debug, and/or fine-grained data capture. Debug and fine-grained capture can collect more detailed information but can come at the expense of greater system resources being consumed for monitoring activities. Debug and/or fine-grained data capture can potentially capture sensitive information such as usernames, passwords, account numbers, etc., and thus can present its own security risks. Measures can be implemented to prevent data loss during exploit attempts. For example, monitoring data can be written to a write-only log to prevent deletion of log data by malicious attackers. For example, a database can be configured to only permit insert operations but not update or delete operations, or a database can maintain a log of update or delete operations that can allow for reconstruction of a database at an earlier point in time.

Monitoring code can be standalone code (e.g., shell scripts, Python scripts, binary applications, bytecode, etc.). The techniques herein can be used, additionally or alternatively, to generate monitoring configurations for existing monitoring software. For example, many organizations use endpoint detection and response (EDR) and/or extended detection and response (XDR) systems, which can monitor and collect data from endpoints such as laptops, desktops, smartphones, tablets, servers, cloud services, email systems, network devices, etc. EDR and XDR systems typically provide functionality for setting up specific monitoring rules, alerts, etc. Such systems can be utilized to provide monitoring and/or alerting functionality.

In some implementations, monitoring code can also implement mitigation actions. For example, a monitoring script, EDR software, XDR software, etc., can be configured to disable network access, disable a port, disable a service, require a user to reset their password, or otherwise intervene when there is an attempted exploit or whenever a vulnerability is detected. In some implementations, such mitigations are undertaken when an attempt to exploit a vulnerability is detected and is not prevented by existing patches.

In some implementations, the techniques herein are used to build a library of patch, deployment, and monitoring components that can be provided to RAG data sources, vectorized, and used to improve future performance. Such information can be applied based on best fit logic. In some implementations, the techniques herein refine best fit logic during training, for example leveraging PEFT LoRA techniques to improve matches. Over time, the library can grow to support multiple patch and/or pipeline approaches. For example, the library can grow to cover multiple operating systems, languages, recovery techniques, deployment targets, layers of control, and so forth.

While artificial intelligence/machine learning models can be powerful tools for identifying exploit paths, generating patches, generating monitoring code, etc., such technologies are not infallible and there may be significant issues with patches, monitoring code, etc. In some implementations, a system can be configured to perform automated testing of patches, monitoring, etc. In some implementations, testing results can be sorted into various categories. For example, in some implementations, a system can categorize a testing result as fully remediated, partially remediated, sufficiently monitored, or unresolved. Full remediation can mean that there is a successful patch that fully mitigates the vulnerability. Partially remediated can mean, for example, that a patch partially mitigates the vulnerability. For example, partial remediation can include actions such as disabling a service, closing a port, changing permissions, etc., until a patch that directly addresses a vulnerability is ready. Sufficiently monitored can indicate that an exploit path has monitoring in place that can reliably detect attempts to exploit a vulnerability. Unresolved can indicate that an exploit path remains available.

In some implementations, the techniques herein generate multiple patches, and a best patch can be identified. Various criteria can be used to identify a best patch. The "best patch" can depend on characteristics of the vulnerability, such as the criticality of a vulnerability, the potential for exfiltration or corruption of sensitive or critical data, and so forth. The "best patch" can, additionally or alternatively, depend on characteristics of the generated patches. Some examples of criteria that can be used in determining a best patch can include, for example and without limitation, effectiveness of the patch (e.g., whether a patch fully or partially remediates a vulnerability), availability impact of the patch (e.g., can patches be applied to a running system or is a reboot required, is there a lengthy installation process, are configuration changes needed, etc.), performance impact of the patch (e.g., is a system's capacity significantly reduced or do operations take significantly longer to carry out?), and so forth.

The above actions (e.g., executing generated exploits, logging results, generating and applying patches, etc.) can, in some cases, though not necessarily, be carried out in a test environment. In some implementations, the test environment can mirror key aspects of a production environment. For example, the test environment can include systems that run the same software, have the same software versions installed, etc. User accounts on test systems can be similar to those on production systems, for example including administrator and non-administrator accounts with permissions that are the same or analogous to those used in production systems.

After creation and testing of a patch, monitoring script, etc., in a development or test environment, the patch, monitoring script, etc., can be deployed to production systems. In some implementations, patches, monitoring scripts, etc., are deployed using deployment scripts. Deployment scripts can be generated from code snippets which can be, for example, stitched together using an LLM and multi-prompt workflows, although some deployment scripts may be short enough that such approaches are not needed and a script can be generated using a single prompt. In some implementations, a system can carry out deployment using existing CICD pipelines. In some cases, human involvement may be required or preferable for deployment to certain production systems.

Even after creation and testing in a development or test environment, there may still be issues with a patch, monitoring script, etc. Accordingly, it can be significant to carry out validation actions in a production environment. In some implementations, validation is carried out in production systems to ensure that there are no unexpected production impacts. Monitoring levels can be confirmed during periods of system load, for example to ensure that monitoring activities do not unacceptably compromise performance of production systems. Monitoring levels can be confirmed during failure mode testing, for example to ensure that logs are not manipulated.

Figure 12:
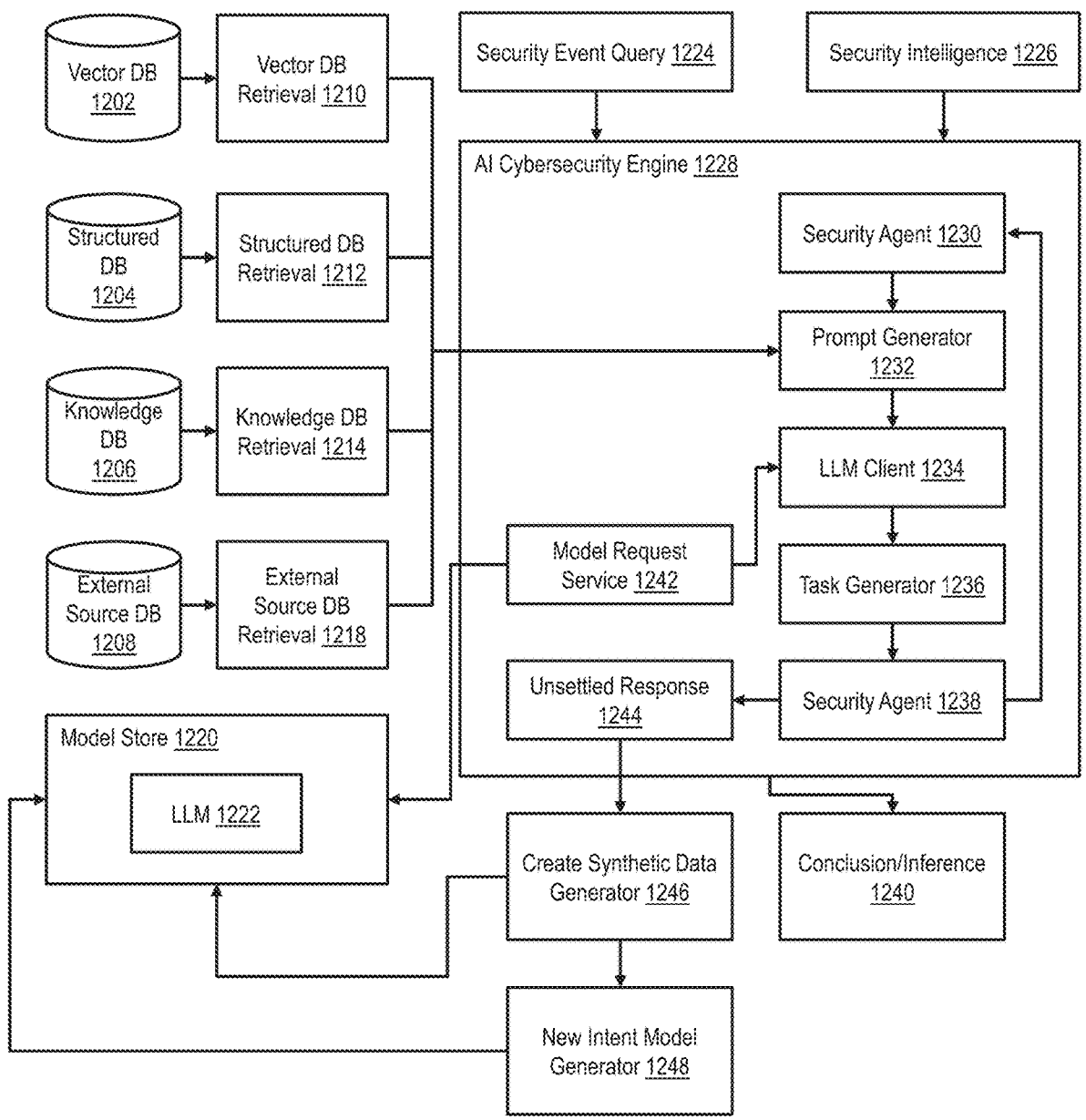
FIG. 12 illustrates an example system according to some implementations that can be used for synthesizing and testing an attack.

FIG. 12 illustrates an example system according to some implementations that can be used for synthesizing and testing an attack. The system can include a vector database 1202, which can store vector representations of vulnerabilities, system information, network information, attacks, etc. The vector database can be accessed using a vector database retrieval module 1210. The system can include a structure database 1204 that contains structured data, such as structured data used in testing an attack function. The structured database 1204 can be accessed using a structured database retrieval module 1212. The system can include a knowledge database 1206 that contains various information such as exploit descriptions, internal knowledge base information, and so forth. The knowledge database 1206 can be accessed via a knowledge database retrieval module 1214. The system can include or can access an external source database 1208. The external source database can contain, for example, information accessed from third party security sources, such as CVE data. The system can include an external source database retrieval module 1218 for accessing the external source database 1208. In some implementations, the vector database retrieval module 1210, structured database retrieval module 1212, knowledge database retrieval module 1214, and/or external source database retrieval module 1218 can be the same module. For example, a single module can accept an input that specifies a database for retrieving data.

The system can include an AI cybersecurity engine 1228 configured to receive a security event query 1224 and/or security intelligence 1226. The AI cybersecurity engine can include a security agent 1230, a prompt generator 1232 configured to generate an LLM prompt based on information retrieved from the vector database 1202, the structure database 1204, the knowledge database 1206, and/or the external source database 1208. The AI cybersecurity engine 1228 can include an LLM client 1234. The LLM client 1234 can retrieve an LLM 1222 from a model store 1220 using a model request service 1242. The LLM client 1234 can receive a prompt generated by the prompt generator 1232. The output of the LLM client 1234 can be provided to a task generator 1236, which can, for example, generate and/or deploy a harness for testing an exploit generated by the LLM client 1234. The results of the task generator 1236 can be provided to a security agent 1238 (which can be the same as the security agent 1230). The AI cybersecurity engine 1228 can carry out operations in an iterative process, for example to test different vulnerabilities, different systems, etc. If the AI cybersecurity engine 1228 reaches a conclusion, the AI cybersecurity engine 1228 can output a conclusion or inference 1240. The inference 1240 can include, for example, an indication of a successful or unsuccessful attack, information about compromised systems, and/or the like. In some cases, the AI cybersecurity engine 1228 can generate an unsettled response 1244, for example when the system was unable to reach a conclusion. The unsettled response 1244 can be provided to a synthetic data generator 1246 to generate new data. The generated data can be stored in the model store 1220. The synthetic data generator 1246 can be provided to a model generator 1248 which can generate a new or modified model that can be stored in the model store 1220.

Figure 13:
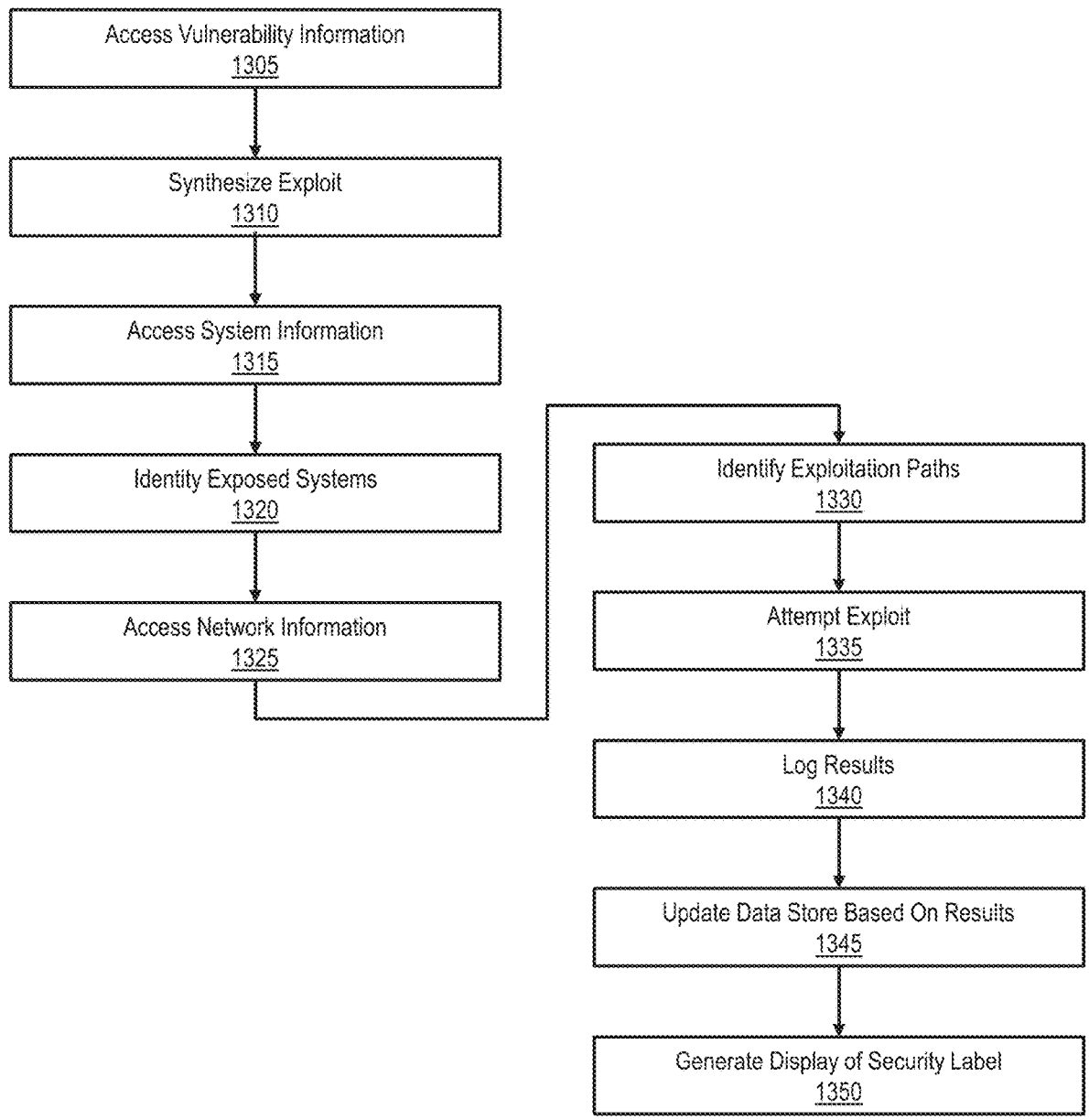
FIG. 13 is a flowchart that illustrates an example process for synthesizing and testing an attack according to some implementations.

FIG. 13 is a flowchart that illustrates an example process for synthesizing and testing an attack according to some implementations. At act 1305, a system can access vulnerability information, such as CVE data, historical exploit data, MITRE CAPEC data, etc. At act 1310, the system can synthesize an exploit for a vulnerability contained in the vulnerability information. In some implementations, the system can use an LLM to synthesize the exploit. In some implementations, the system can utilize RAG in synthesizing the exploit. As described herein, in some implementations, multi-prompting, chunking, and/or other techniques can be used in synthesizing the exploit. At act 1315, the system can access system information, which can include information about hardware, installed software, etc. The system can, at act 1320, use the accessed system information to identify exposed systems. Exposed systems can be systems that have hardware and/or software that is potentially at risk due to the vulnerability.

In some implementations, the system can identify exploitation paths. For example, the system can determine potential exploitation paths for exposed systems. At act 1325, the system can access network information, which can describe, for example, how exposed systems are connected to other systems, to the internet, etc. The network information can, in some implementations, indicate open ports, exposed services, etc. At act 1330, the system can, based at least in part on the accessed network information, determine one or more exploitation paths that can be used to exploit the vulnerability.

At act 1335, the system can attempt to execute the synthesized exploit. For example, the system can use the identified exploitation paths to attempt to carry out the synthesized exploit against the identified exposed systems. The system can, at act 1340, log the results of the exploit attempts. The logs can indicate, for example, parameters that were used during an attempt, whether or not an attempt was successful, the time taken to carry out an exploit, and/or other information relevant to the exploit. At act 1345, the system can update a data store based on the log results. As described herein, the log results can be used as part of a RAG step when synthesizing exploits, identifying exploitation paths, etc. At act 1350, the system can generate a security label that can be displayed to a user. The security label can include information indicative of the results of executing the synthesized exploit.

Figure 14:
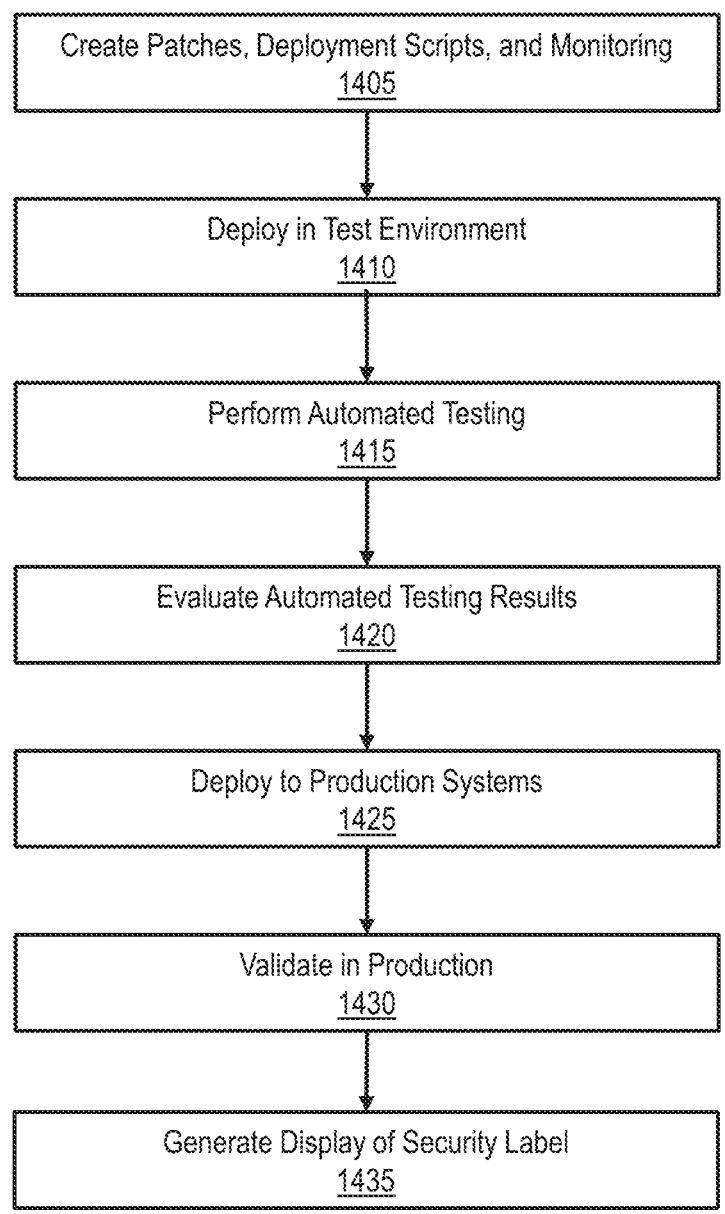
FIG. 14 is a flowchart that illustrates an example process for creating, testing, deploying, and/or monitoring patches and/or patched system according to some implementations.

FIG. 14 is a flowchart that illustrates an example process for creating, testing, deploying, and/or monitoring patches and/or patched system according to some implementations. At act 1405, a system can generate a patch, deployment script, and/or monitoring script or application, for example as described herein, for example, using an LLM. At act 1410, the system can deploy the patch, deployment script, and/or monitoring script in a test environment, for example using CICD processes where available. In some implementations, deployment can be carried out manually. At act 1415, the system can perform automated testing. For example, a synthesized exploit can be executed against target systems in the test environment, and the results of the exploitation attempts can be logged. At act 1420, the system can evaluate the automated testing results, which can indicate, for example, if target systems are still compromised, if vulnerabilities are partially mitigated, if attack attempts are properly logged (e.g., presence of key information such as IP addresses, usernames, etc., or absence of sensitive information such as account numbers, social security numbers, etc.), and so forth. At act 1425, the system can, if the testing results are acceptable, deploy the patches, deployment scripts, and/or monitoring to a production environment.

As described herein, in some cases, the system can generate and test multiple patches. The system can test each generated patch and evaluate the results to select a patch for potential deployment, for example based on criteria such as vulnerability mitigation effectiveness, availability impact, performance impact, etc.

As described herein, even after successful testing in a test environment, there may still be concerns that a patch, deployment script, and/or monitoring may behave unexpectedly in a production environment or may have unanticipated downstream effects. At act 1430, the system can validate the patch, deployment script, and/or monitoring in the production environment. For example, the system can process log data to determine if a vulnerability has been successfully mitigated, a patch was successfully logged, performance is not overly or unexpectedly impacted, etc. At act 1435, the system can generate a security label that can be displayed to a user. The security label can include information indicative of the results of validating the patch.

FIG. 15 is a drawing that illustrates an example security label for patches according to some implementations. The security label 1500 can provide an overview or summary of one or more patches, for example to indicate effectiveness of a patch, performance impact of a patch, monitoring effectiveness, etc. In FIG. 15, the security label shows information for three patches 1502*a*, 1502*b*, and 1502*c*, but it will be appreciated that a security label can show information for any number of patches. In some implementations, the security label 1500 can be generated after a patch testing phase or after a patch deployment phase. The security label can show a severity or risk level for various aspects 1504*a*-1504*f*. For example, the security label can show information for a platform, data storage, network, cryptography, etc. The security label can show the performance impact of a patch. In some implementations, the security label can show a monitoring effectiveness of the patch or monitoring code or functionality associated with the patch. The security label can display an indication of a value associated with each aspect 1504. The indication can include, for example, values, shapes, colors, etc. The security label 1500 can include a legend 1506 that provides an explanation for shapes, colors, etc., used in the security label 1500. In some implementations, the security label 1500 can show an assessed risk (AR) and a mitigated risk (MR). The assessed risk can be a risk associated with a vulnerability. The risk can be low, medium, or high in FIG. 15, although other ranking approaches are possible. For example, a high risk vulnerability can be a vulnerability that is easy to exploit, has a high risk to impact production systems negatively, has a high risk of data corruption or theft, etc., while a low risk vulnerability can be a vulnerability with little potential for exploit (e.g., because it requires physical access to a system), where a successful exploit would have little or no noticeable impact on production, or where the is little or no risk of data loss or theft.

In FIG. 15, three patches for a vulnerability are depicted. In FIG. 15, the vulnerability affects networking and is assessed as high risk. The patch 1502*a* effectively mitigates the vulnerability but, as shown in FIG. 15, has a moderate impact on performance. The patch 1502*b* has relatively little performance impact but is worse than the patch 1502*a* at mitigating the risk and providing effective monitoring. The patch 1502*c* fails to vulnerability and fails to provide effective monitoring.

A security label can be presented in various forms. In FIG. 15, the security label shows assessed risks and mitigated risks for a vulnerability and multiple patches. In some implementations, a system generates a security label prior to generating patches or without considering available patches, in which case the security label may not include patch-specific information. For example, the security label can include assessed risks for one or more vulnerabilities or for one or more vulnerable systems. As an example, if systems A, B, and C are vulnerable, the security label can include columns for A, B, and C, and can be populated with values for assessed risk for A, B, and C. In some cases, the assessed risk may be the same, but can be different because, for example, different systems can have different networking configurations, access permissions, etc., can contain information that is more or less sensitive, or can be used for carrying out functions that are more or less critical to an organization. In some cases, a security label can include one or more mitigation actions that can be taken to mitigate the risk posed by a vulnerability. In some implementations, mitigation actions are not part of the security label itself but are presented in a graphical output to a user.

Providing a security label such as the one shown in FIG. 15 can be significant because, for example, while automatic patch generation can provide many benefits, such patches may not always be successful in mitigating risk, may have inadequate logging, may have unacceptable performance impacts, etc. In some implementations, the approaches herein can be used to automatically select a best patch to apply. However, even the best patch may in some cases have one or more issues such as performance impacts, and in some cases the best patch may not fully mitigate the vulnerability. Thus, it can be significant to provide a security label such as the security label 1500 so that network engineers, developers, and so forth can have a better understanding of the effectiveness and impact of patches developed using the approaches described herein. In some cases, patch selection can be manual, and an engineer, developer, etc., can review a security label such as the security label 1500 to aid them in determining which, if any, patch to apply.

In some implementations, the approaches herein can be used to assess end-to-end security risk for an application or platform, as described in parent application Ser. No. 18/114,194, filed Feb. 24, 2023, the contents of which are incorporated by reference in their entirety.

Figure 16:
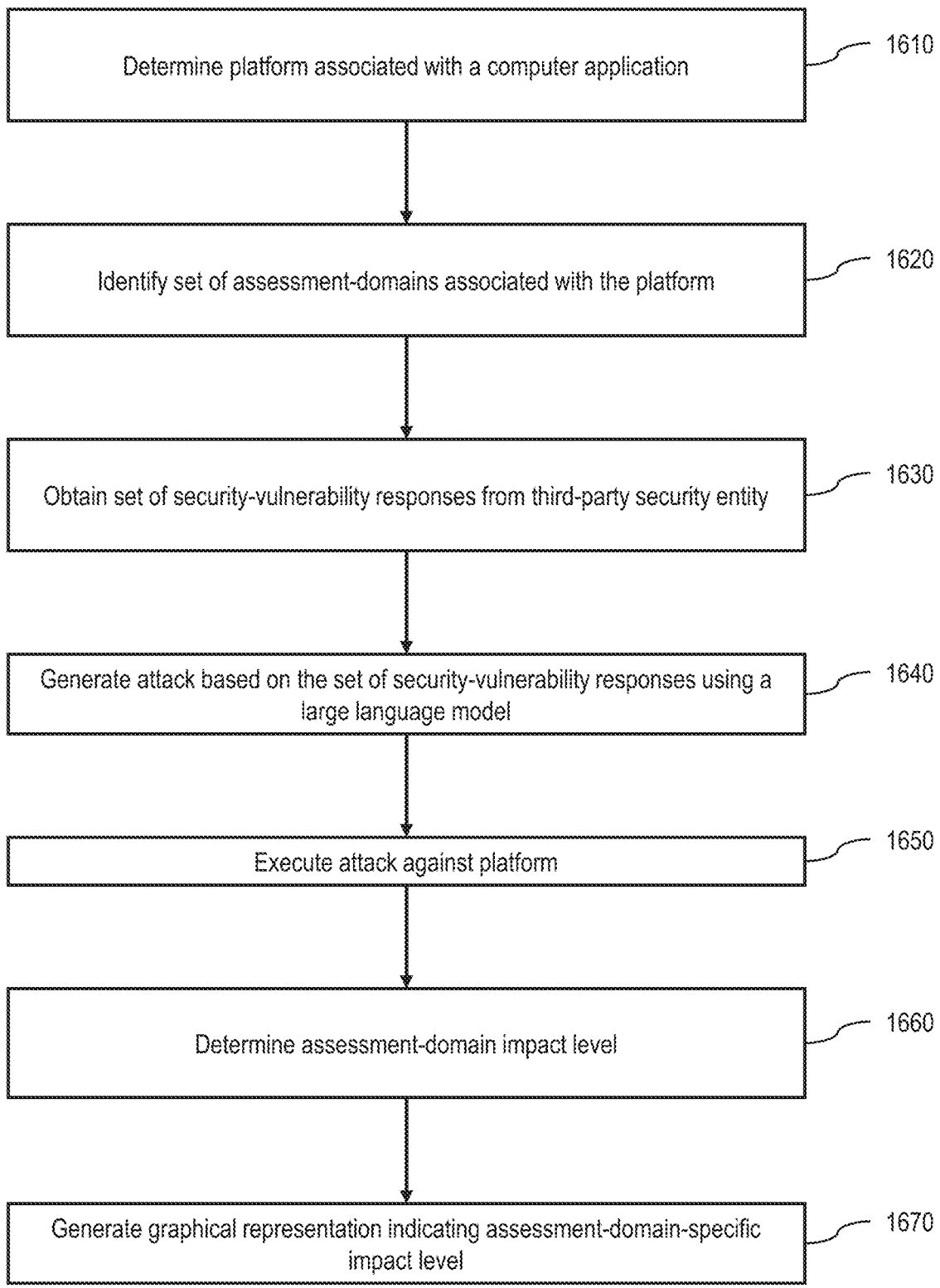
FIG. 16 is a flowchart that illustrates an example process for evaluating security of a platform according to some implementations.

FIG. 16 is a flowchart that illustrates an example process for evaluating security of a platform according to some implementations. At act 1610, a system can determine a platform associated with a computer application. The platform can indicate an ecosystem of computing resources associated with the computer application. At act 1620, the system can identify a set of assessment-domains (e.g., cryptography, network, platform, data storage, etc.) associated with the platform, for example by comparing a platform identifier of the platform to assessment-domain-mapping data structure. At act 1630, the system can obtain a set of security-vulnerability responses (e.g., vulnerability data such as CVE data) from a third-party security entity. The set of security-vulnerability responses can indicate a security threat (e.g., a vulnerability) associated with the platform, for example, a security vulnerability affecting at least one of the computing resources associated with the application. At act 1640, the system can generate an attack based on the set of security-vulnerability responses using a large language model, as described herein. At act 1650, the system can execute the attack against the platform, for example against one or more computing resources associated with the application. At act 1660, the system can evaluate the results of executing the attack (e.g., log data that indicates whether or not an attack was successful, whether sensitive information was exposed, etc.), to determine an assessment-domain impact level for one or more of the assessment-domains associated with the platform. At act 1670, the system can generate a security label that indicates one or more assessment-domain-specific impact levels.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A method for analyzing changes to a computing platform, the method comprising:
   determining first platform information indicative of a first state of the computing platform;
   determining second platform information indicative of a second state of the computing platform,
      wherein the second state is a later state than the first state;
   determining a change in an attack surface of the computing platform based on a difference between first state and second state,
      wherein the difference between the first state and the second state is determined at least in part by providing data representing at least part of the first platform information and at least part of the second platform information to an artificial intelligence model;
   accessing tactic, technique, and procedure (TTP) information indicative of malicious activity that could occur on the computing platform;
   identifying a subset of the TTP information based on the determined change in the attack surface of the computing platform;
   generating, based on the determined change in the attack surface and the subset of the TTP information, a prompt for a large language model;
   applying the large language model to the prompt,
      wherein the large language model is configured to generate an output indicative of a vulnerability present in the second state and not present in the first state;
   determining that the vulnerability is exploitable to cause an aberrant behavior of the computing platform in the second state of the computing platform,
      wherein determining that the vulnerability is exploitable comprises identifying one or more exploits for the vulnerability;
   determining a mitigation action for the vulnerability;
   generating for display a security label indicating a first impact level of the second state before applying the mitigation action and a second impact level of the second state after applying the mitigation action, wherein the first impact level and the second impact level indicate levels of impact with respect to one or more computing aspects of the computing platform.

2. A method for analyzing changes to a computing platform, the method comprising:
   determining first platform information indicative of a first state of the computing platform;
   determining second platform information indicative of a second state of the computing platform,
      wherein the second state is a different state than the first state;
   determining a change in an attack surface based on a difference between first state and second state;
   accessing tactic, technique, and procedure (TTP) information;
   generating, based on the determined change in the attack surface and the TTP information, a prompt for a large language model;
   applying the large language model to the prompt,
      wherein the large language model is configured to generate an output indicative of a vulnerability present in the second state and not present in the first state;
   determining that the vulnerability is exploitable,
      wherein determining that the vulnerability is exploitable comprises identifying one or more exploits for the vulnerability; and
   determining a mitigation action for the vulnerability.

3. The method of claim 2, further comprising:
   applying the mitigation action on the computing platform to cause the computing platform to be in a third state;
   applying the large language model to a second prompt comprising at least information indicative of the third state; and
   determining, based at least in part on a result of applying the large language model to the second prompt, that the vulnerability present in the second state is not present in the third state.

4. The method of claim 2, where the change in the platform comprises a change in at least one of: an authentication method, a cloud service provider, a network architecture, a software patch, a software version, an application programming interface, or an integration with a third party service.

5. The method of claim 2, wherein the large language model comprises an ensemble of two or more large language models.

6. The method of claim 5, wherein each large language model of the ensemble of large language models is configured to evaluate vulnerabilities within a different assessment domain of a plurality of assessment domains comprising at least one of: input validation, third party service integration, application programming interface (API) access, cryptography, or authentication.

7. The method of claim 2 wherein determining the second platform information comprises receiving a natural language description of a proposed change to the first state.

8. The method of claim 2, further comprising accessing common vulnerabilities and exposures (CVE) information, wherein generating the prompt is further based at least on part on the accessed CVE information.

9. The method of claim 2, wherein the difference between the first state and the second state is determined at least in part by providing data representing at least part of the first platform information and at least part of the second platform information to an artificial intelligence model.

10. The method of claim 2, further comprising:
generating for display a security label, wherein the security label indicates at least an impact level of the second state before applying the mitigation action and an impact level of the second state after applying the mitigation action.

11. The method of claim 2, wherein the second state comprises an addition of a third party vendor, wherein the method further comprises:
determining an attack surface for the third party vendor.

12. The method of claim 11, further comprising:
determining a first impact level for an assessment domain for the first state;
determining a second impact level for the assessment domain for the second state;
determining a third impact level for the assessment domain for the third party vendor; and
generating for display a security label, wherein the security label indicates at least the first impact level, the second impact level, and the third impact level.

13. A system for analyzing changes to a computing platform, the system comprising:
at least one hardware processor; and
at least one non-transitory memory storing instructions which, when executed by the at least one hardware processor, cause the system to:
determining first platform information indicative of a first state of the computing platform;
determining second platform information indicate of a second state of the computing platform,
wherein the second state is a different state than the first state;
determining a change in an attack surface based on a difference between first state and second state;
accessing tactic, technique, and procedure (TTP) information;
generating, based on the determined change in the attack surface and the TTP information, a prompt for a large language model;
applying the large language model to the prompt,
wherein the large language model is configured to generate an output indicative of a vulnerability present in the second state and not present in the first state;
determining that the vulnerability is exploitable,
wherein determining that the vulnerability is exploitable comprises identifying one or more exploits for the vulnerability; and
determining a mitigation action for the vulnerability.

14. The system of claim 13, wherein the change in the platform comprises a change in at least one of: an authentication method, a cloud service provider, a network architecture, a software patch, a software version, an application programming interface, or an integration with a third party service.

15. The system of claim 13, wherein the large language model comprises an ensemble of large language models.

16. The system of claim 13, wherein determining the second platform information comprises receiving a natural language description of a proposed change to the first state.

17. The system of claim 13, where the instructions are further configured to cause the system to:
access common vulnerabilities and exposures (CVE) information, wherein generating the prompt is further based at least on part on the accessed CVE information.

18. The system of claim 13, wherein the difference between the first state and the second state is determined at least in part by providing data representing at least part of the first platform information and at least part of the second platform information to an artificial intelligence model.

19. The system of claim 13, where the instructions are further configured to cause the system to:
generate for display a security label indicating at least an impact level of the second state before applying the mitigation action and an impact level of the second state after applying the mitigation action.

20. The system of claim 13, wherein the second state comprises an addition of a third party vendor, wherein the instructions are further configured to cause the system to:
determine an attack surface for the third party vendor;
determine a first impact level for an assessment domain for the first state;
determine a second impact level for the assessment domain for the second state;
determine a third impact level for the assessment domain for the third party vendor; and
generate for display a security label indicating at least the first impact level, the second impact level, and the third impact level.

* * * * *